(12) United States Patent
Kato et al.

(10) Patent No.: US 7,421,065 B2
(45) Date of Patent: Sep. 2, 2008

(54) INTERNET TELEPHONE SYSTEM

(75) Inventors: Tokunori Kato, Ichinomiya (JP); Tetsuya Ouchi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 883 days.

(21) Appl. No.: 10/663,915

(22) Filed: Sep. 17, 2003

(65) Prior Publication Data

US 2004/0058676 A1 Mar. 25, 2004

(30) Foreign Application Priority Data

Sep. 18, 2002 (JP) .............................. 2002-271787

(51) Int. Cl.
*H04M 1/64* (2006.01)

(52) U.S. Cl. .................. 379/68; 379/88.17; 379/88.12; 455/413; 370/352

(58) Field of Classification Search ................ 379/67.1, 379/68, 88.17, 88.12; 370/495, 259, 352; 455/412.1, 412.2, 413
See application file for complete search history.

(56) References Cited

U.S. PATENT DOCUMENTS

| 5,572,576 | A | * | 11/1996 | Klausner et al. ......... 379/88.11 |
| 5,826,187 | A | * | 10/1998 | Core et al. ............... 455/412.1 |
| 6,091,947 | A | * | 7/2000 | Sumner ..................... 455/413 |
| 6,404,764 | B1 | * | 6/2002 | Jones et al. ................. 370/352 |
| 6,546,241 | B2 | * | 4/2003 | Iyengar et al. ........... 455/412.1 |
| 6,766,162 | B1 | * | 7/2004 | Beamish .................. 455/412.1 |
| 6,816,723 | B1 | * | 11/2004 | Borland ................... 455/412.1 |
| 6,834,042 | B1 | * | 12/2004 | Sugiyama .................. 370/259 |
| 6,901,266 | B2 | * | 5/2005 | Henderson .................. 455/462 |
| 2002/0162116 | A1 | * | 10/2002 | Read et al. .................. 725/106 |

FOREIGN PATENT DOCUMENTS

| JP | A 6-13969 | 1/1994 |
| JP | 2001-086209 | 3/2001 |

\* cited by examiner

*Primary Examiner*—Olisa Anwah
(74) *Attorney, Agent, or Firm*—Oliff & Berridge, PLC

(57) ABSTRACT

An internet terminal is capable of transmitting and receiving voice signals to and from a telephone terminal having a handset. If the internet terminal receives an incoming call when disconnected from the telephone terminal, then the internet terminal stores a voice message from a calling party and issues a notification to the telephone terminal regarding the stored voice message when the telephone terminal is subsequently connected to the internet terminal.

18 Claims, 21 Drawing Sheets

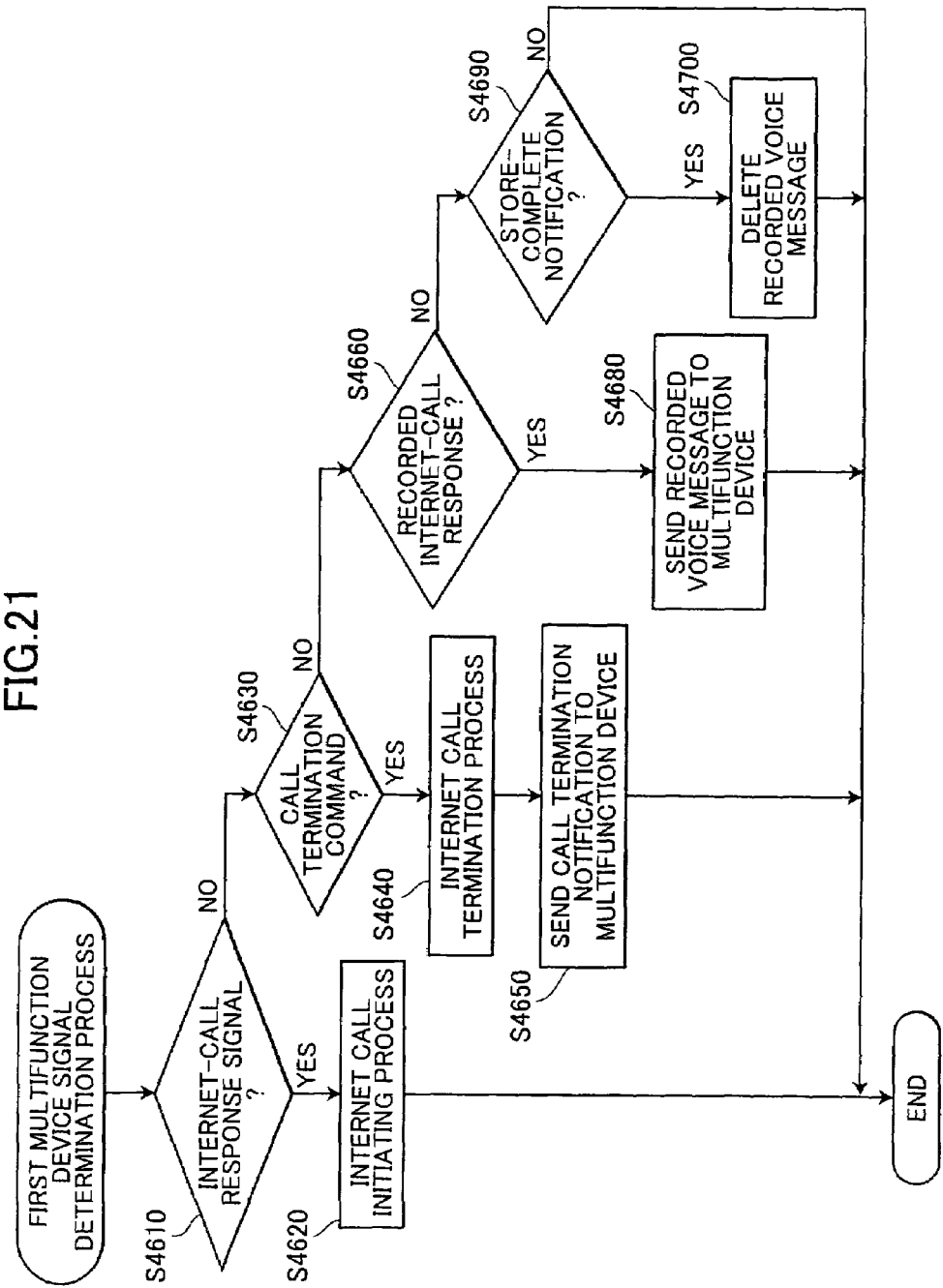

INTERNET TELEPHONE SYSTEM

BACKGROUND OF THE INVENTION

1. Field of the Invention

The present invention relates to an internet telephone system for achieving the functions of an internet telephone.

2. Related Art

In recent years, internet terminals capable of transmitting and receiving data over the Internet have become widespread. This type of internet terminal includes internet calling functions for executing a voice call by inputting and outputting voice signals via the Internet and inputting and outputting voice sounds based on such voice signals via a transceiver connected to the internet terminal. Examples of the transceiver include a handset that integrally combines a headphone or earphone with a microphone.

Voice sound based on voice signals inputted and outputted via the Internet can be inputted and outputted via a microphone and a speaker provided in the internet terminal. Depending on the installation positions of the microphone and speaker, however, voice sound outputted from the speaker may be difficult to understand and the volume of voice sound inputted via the microphone may be too low, resulting in an unsatisfactory voice call. Therefore, as disclosed in Japanese unexamined patent application publication No. 2001-86209, for example, a transceiver connected to the internet terminal is generally employed when using the internet calling functions.

However, since this transceiver is a special device for using the internet calling functions, the transceiver cannot be used for purposes other than using the internet calling functions.

It is conceivable to use, as a device functioning as the transceiver, a common telephone terminal that achieves voice calls by inputting and outputting voice sound through a handset based on voice signals transmitted via a telephone line network. When not using the internet calling functions, this type of telephone terminal can be used as an ordinary telephone terminal. In this case, there is no need to prepare a special device only for using the internet calling functions.

However, using a common telephone terminal in this manner raises a problem that a notification of an incoming call is not given on the telephone terminal end if the incoming call is received while the telephone terminal is disconnected from the internet terminal. Because a user on the telephone terminal end will not notice the incoming internet call in this case, the user cannot answer the incoming call and in some cases cannot even learn that there was an incoming call.

SUMMARY OF THE INVENTION

In the view of foregoing, it is an object of the present invention to overcome the above problems, and also to provide an internet terminal, a telephone terminal, and an internet calling system capable of knowing when a user had an incoming call even if the incoming call is received when the telephone terminal is disconnected from the internet terminal. It is another object of the present invention to provide a terminal controlling program that can be used in this system.

In order to attain the above and other objects, the present invention provides an internet terminal including a voice signal input/output terminal via which voice signals are output to and input from an external telephone terminal including a communications transceiver, a control signal input/output terminal via which control signals are output to and input from the telephone terminal, a voice signal relaying unit that performs a relaying process for transmitting voice signals received via the voice signal input/output terminal from the telephone terminal to another internet terminal via an internet and for outputting voice signals received from the another internet terminal via the internet to the telephone terminal via the voice signal input/output terminal, a ring signal output unit that outputs a ring signal via the control signal input/output terminal to the telephone terminal when a ring signal for an internet call is received by the voice signal relaying unit from the another internet terminal via the internet, a determining unit that determines whether a ring response signal is received via the control signal input/output terminal after the ring signal output unit has output the ring signal to the telephone terminal, the ring response signal being output from the telephone terminal in response to the ring signal, a message output unit that outputs a predetermined outgoing message to the another internet terminal through the voice signal relaying unit, the outgoing message prompting a caller at the another internet terminal to leave a message, a memory that stores voice signals received by the voice signal relaying unit from the another internet terminal, and a control unit that controls the voice signal relaying unit and the message output unit. The control unit controls the voice signal relaying unit to perform the relaying process when the determining unit determines that the ring response signal has been received from the telephone terminal, and the control unit controls the message output unit to output the outgoing message to the another internet terminal and stores voice signals received by the message signal relaying unit from the another internet terminal into the memory when the determining unit determines that the ring response signal was not received from the telephone terminal.

There is also provided a telephone terminal including a telephone line connecting terminal that connects to a telephone line network, a transceiver that enables a voice call based on voice signals transmitted to and received from an external telephone terminal via the telephone line connecting terminal and the telephone line network, a voice signal input/output terminal via which voice signals are output to and input from an internet terminal, a control signal input/output terminal via which control signals are output to and input from the internet terminal, a first notifying unit that notifies a user of an incoming call when a ring signal is received from the internet terminal via the control signal input/output terminal, an input unit that inputs a call-initiate command to initiate an internet call through operations by the user, a switching unit that switches a transmission terminal between the telephone line connecting terminal and the voice signal input/output terminal, wherein the switching unit switches the transmission terminal to the voice signal input/output terminal when the call-initiate command is input, a terminal controller that outputs a ring response signal to the internet terminal via the control signal input/output terminal when the call-initiate command is input, the ring response signal instructing the internet terminal to perform a relaying process for relaying voice signals between another internet terminal and the voice signal input/output terminal, and a second notifying unit that notifies the user of a stored voice message when a notification signal is received from the internet terminal.

Here, user operations for triggering use of the internet calling functions are not limited to specific operations. However, one example would be to provide a special operating part, such as a switch, for initiating an internet call, wherein the user would operate this special operating part.

As another example of specific user operations, a special operating procedure is provided for initiating an internet call, wherein the user performs operations according to the operating procedure. Examples of this operating procedure include pressing and holding down a specific operating button for a specific period of time and performing operations with a plurality of operating buttons in a specific sequence.

There is also provided a telephone terminal including a telephone line connecting terminal that connects to a telephone line network, a transceiver that enables a voice call based on voice signals transmitted to and received from an external telephone terminal via the telephone line connecting terminal and the telephone line network, a voice signal input/output terminal via which voice signals are output to and input from an internet terminal, a control signal input/output terminal via which control signals are output to and input from the internet terminal, a first notifying unit that notifies a user of an incoming call when a ring signal is received from the internet terminal via the control signal input/output terminal, an input unit that inputs a call-initiate command to initiate an internet call through operations by the user, a switching unit that switches a transmission terminal between the telephone line connecting terminal and the voice signal input/output terminal, wherein the switching unit switches the transmission terminal to the voice signal input/output terminal when the call-initiate command is input, a terminal controller that outputs a ring response signal to the internet terminal via the control signal input/output terminal when the call-initiate command is input, the ring response signal instructing the internet terminal to perform a relaying process to relay voice signals between another internet terminal and the voice signal input/output terminal, a response signal output unit that outputs a notification response to the internet terminal via the control signal input/output terminal when a notification signal is received from the internet terminal, the notification signal indicating that a voice message has been stored on the internet terminal, a memory that stores a voice message received from the internet terminal, the voice message being output from the internet terminal in response to the notification response, and a second notifying unit that notifies the user of the voice message stored in the memory.

There is also provided an internet telephone system including an internet terminal and a telephone terminal. The internet terminal includes a voice signal input/output terminal via which voice signals are output to and input from an external telephone terminal including a communications transceiver, a control signal input/output terminal via which control signals are output to and input from the telephone terminal, a voice signal relaying unit that performs a relaying process for transmitting voice signals received via the voice signal input/output terminal from the telephone terminal to another internet terminal via an internet and for outputting voice signals received from the another internet terminal via the internet to the telephone terminal via the voice signal input/output terminal, a ring signal output unit that outputs a ring signal via the control signal input/output terminal to the telephone terminal when a ring signal for an internet call is received by the voice signal relaying unit from the another internet terminal via the internet, a determining unit that determines whether a ring response signal is received via the control signal input/output terminal after the ring signal output unit has output the ring signal to the telephone terminal, the ring response signal being output from the telephone terminal in response to the ring signal, a message output unit that outputs a predetermined outgoing message to the another internet terminal through the voice signal relaying unit, the outgoing message prompting a caller at the another internet terminal to leave a message, a memory that stores voice signals received by the voice signal relaying unit from the another internet terminal, a control unit that controls the voice signal relaying unit and the message output unit, and a notifying unit. The control unit controls the voice signal relaying unit to perform the relaying process when the determining unit determines that the ring response signal has been received from the telephone terminal, and the control unit controls the message output unit to output the outgoing message to the another internet terminal and stores voice signals received by the message signal relaying unit from the another internet terminal into the memory when the determining unit determines that the ring response signal was not received from the telephone terminal. The notifying unit outputs a notification signal to the telephone terminal via the control signal input/output terminal when the voice signals from the another internet terminal are being stored in the memory. The notification signal is for notifying a user of presence of a recorded voice message. The telephone terminal includes a telephone line connecting terminal that connects to a telephone line network, a transceiver that enables a voice call based on voice signals transmitted to and received from an external telephone terminal via the telephone line connecting terminal and the telephone line network, another voice signal input/output terminal via which voice signals are output to and input from the voice signal input/output terminal of the internet terminal, another control signal input/output terminal via which control signals are output to and input from the control signal input/output terminal of the internet terminal, an incoming-call notifying unit that notifies a user of an incoming call when a ring signal is received from the internet terminal via the another control signal input/output terminal, an input unit that inputs a call-initiate command to initiate an internet call through operations by the user, a switching unit that switches a transmission terminal from the telephone line connecting terminal to the another voice signal input/output terminal when the call-initiate command is input, a terminal controller that outputs a ring response signal to the internet terminal via the another control signal input/output terminal when the call-initiate command is input, and a message notifying unit that notifies the user of a stored voice message when the notification signal is received from the internet terminal.

There is also provided an internet telephone system including an internet terminal and a telephone terminal. The internet terminal includes a voice signal input/output terminal via which voice signals are output to and input from an external telephone terminal including a communications transceiver, a control signal input/output terminal via which control signals are output to and input from the telephone terminal, a voice signal relaying unit that performs a relaying process for transmitting voice signals received via the voice signal input/output terminal from the telephone terminal to another internet terminal via an internet and for outputting voice signals received from the another internet terminal via the internet to the telephone terminal via the voice signal input/output terminal, a ring signal output unit that outputs a ring signal via the control signal input/output terminal to the telephone terminal when a ring signal for an internet call is received by the voice signal relaying unit from the another internet terminal via the internet, a determining unit that determines whether a ring response signal is received via the control signal input/output terminal after the ring signal output unit has output the ring signal to the telephone terminal, the ring response signal being output from the telephone terminal in response to the ring signal, a message output unit that outputs a predetermined outgoing message to the another internet terminal through the voice signal relaying unit, the outgoing message prompting a caller at the another internet terminal to leave a message, a memory that stores voice signals received by the voice signal relaying unit from the another internet terminal, a control unit that controls the voice signal relaying unit and the message output unit, and a playback unit. The control unit controls the voice signal relaying unit to perform the relaying process when the determining unit determines that the ring response signal has been received from the telephone terminal, controls the message output unit to output the outgoing message to the another internet terminal and stores voice signals received by the message signal relaying unit from the another internet terminal into the memory when the determining unit determines that the ring response signal was not received from the telephone terminal. The playback unit outputs a voice message based on the voice signals stored in the memory to the telephone terminal via the voice signal input/output unit when a playback command from the telephone terminal is received via the control signal input/output terminal. The telephone terminal includes a telephone line connecting terminal that connects to a telephone line network, a transceiver that enables a voice call based on voice signals transmitted to and received from an external telephone terminal via the telephone line connecting terminal and the telephone line network, another voice signal input/output terminal via which voice signals are output to and input from the voice signal input/output terminal of the internet terminal, another control signal input/output terminal via which control signals are output to and input from the control signal input/output terminal of the internet terminal, an incoming-call notifying unit that notifies a user of an incoming call when a ring signal is received from the internet terminal via the another control signal input/output terminal, an input unit that inputs a call-initiate command to initiate an internet call through operations by the user, a switching unit that switches a transmission terminal from the telephone line connecting terminal to the another voice signal input/output terminal when the call-initiate command is input, a terminal controller that outputs a ring response signal to the internet terminal via the another control signal input/output terminal when the call-initiate command is input, and a message notifying unit that notifies the user of a stored voice message when the notification signal is received from the internet terminal. The input unit further inputs a playback command through operations by the user. The switching unit switches the transmission terminal to the another voice signal input/output terminal when the playback command is input. The terminal controller outputs the playback command via the another control signal input/output terminal to the internet terminal.

There is also provided an internet telephone system including an internet terminal and a telephone terminal. The internet terminal includes a voice signal input/output terminal via which voice signals are output to and input from an external telephone terminal including a communications transceiver, a control signal input/output terminal via which control signals are output to and input from the telephone terminal, a voice signal relaying unit that performs a relaying process for transmitting voice signals received via the voice signal input/output terminal from the telephone terminal to another internet terminal via an internet and for outputting voice signals received from the another internet terminal via the internet to the telephone terminal via the voice signal input/output terminal, a ring signal output unit that outputs a ring signal via the control signal input/output terminal to the telephone terminal when a ring signal for an internet call is received by the voice signal relaying unit from the another internet terminal via the internet, a determining unit that determines whether a ring response signal is received via the control signal input/output terminal after the ring signal output unit has output the ring signal to the telephone terminal, the ring response signal being output from the telephone terminal in response to the ring signal, a message output unit that outputs a predetermined outgoing message to the another internet terminal through the voice signal relaying unit, the outgoing message prompting a caller at the another internet terminal to leave a message, a memory that stores voice signals received by the voice signal relaying unit from the another internet terminal, and a control unit that controls the voice signal relaying unit and the message output unit. The control unit controls the voice signal relaying unit to perform the relaying process when the determining unit determines that the ring response signal has been received from the telephone terminal, and the control unit controls the message output unit to output the outgoing message to the another internet terminal and stores voice signals received by the message signal relaying unit from the another internet terminal into the memory when the determining unit determines that the ring response signal was not received from the telephone terminal. The internet terminal further includes a notifying unit that outputs a notification signal to the telephone terminal via the control signal input/output terminal when the voice signals from the another internet terminal are being stored in the memory, the notification signal notifying a user of presence of a recorded voice message, and a playback unit that outputs a voice message based on the voice signals stored in the memory to the telephone terminal via the voice signal input/output terminal when a notification response is received via the control signal input/output terminal from the telephone terminal, the notification response being output from the telephone terminal in response to the notification signal. The telephone terminal includes a telephone line connecting terminal that connects to a telephone line network, a transceiver that enables a voice call based on voice signals transmitted to and received from an external telephone terminal via the telephone line connecting terminal and the telephone line network, another voice signal input/output terminal via which voice signals are output to and input from the voice signal input/output terminal of the internet terminal, another control signal input/output terminal via which control signals are output to and input from the control signal input/output terminal of the internet terminal, an incoming-call notifying unit that notifies a user of an incoming call when a ring signal is received from the internet terminal via the another control signal input/output terminal, an input unit that inputs a call-initiate command to initiate an internet call through operations by the user, a switching unit that switches a transmission terminal from the telephone line connecting terminal to the another voice signal input/output terminal when the call-initiate command is input, a terminal controller that outputs a ring response signal to the internet terminal via the another control signal input/output terminal when the call-initiate command is input, a response signal output unit that outputs a notification response to the internet terminal via the another control signal input/output terminal in response to the notification signal received from the internet terminal, another memory that stores a voice message received from the internet terminal, the voice message being output by the internet terminal in response to the notification response, and a message notifying unit that notifies the user of the voice message stored in the another memory.

There is also provided a storing medium storing a control program of controlling an internet terminal. The control program includes the programs of outputting a ring signal from a ring signal output unit to an external telephone terminal via a control signal input/output terminal when a ring signal for an internet call is received by a voice signal relaying unit from another internet terminal via an internet, determining whether a ring response signal is received via the control signal input/output terminal after having output the ring signal to the external telephone terminal, the ring response signal being output from the telephone terminal in response to the ring signal, controlling the voice signal relaying unit to perform a relaying process for outputting voice signals received from the another internet terminal to the telephone terminal and outputting voice signals received from the telephone terminal to the another internet terminal when it is determined that the ring response signal has been received from the telephone terminal, outputting a predetermined outgoing message to the another internet terminal through the voice signal relaying unit and storing voice signals received by the voice signal relaying unit from the another internet terminal into a memory when it is determined that the ring response signal was not received from the telephone terminal, the outgoing message prompting a caller at the another internet terminal to leave a message.

There is also provided a storing medium storing a control program for controlling a telephone terminal communicable with an internet terminal. The control program includes the programs of notifying a user of an incoming call when a ring signal is received from the internet terminal via a control signal input/output terminal, inputting a call-initiate command to initiate an internet call through operations by the user, switching a transmission terminal from a telephone line connecting terminal to a voice signal input/output terminal when the call-initiate command is input, outputting a ring response signal to the internet terminal via the control signal input/output terminal when the call-initiate command is input, and notifying the user of a stored voice message when a notification signal is received from the internet terminal.

There is also provided a storing medium storing a control program for controlling a telephone terminal communicable with an internet terminal. The control program includes the programs of notifying a user of an incoming call when a ring signal is received from the internet terminal via a control signal input/output terminal, inputting a call-initiate command to initiate an internet call through operations by the user, switching a transmission terminal from a telephone line connecting terminal to a voice signal input/output terminal when the call-initiate command is input, outputting a ring response signal to the internet terminal via the control signal input/output terminal when the call-initiate command is input, the ring response signal instructing the internet terminal to perform a relaying process to relay voice signals between another internet terminal and the voice signal input/output terminal, outputting a notification response to the internet terminal via the control signal input/output terminal when a notification signal is received from the internet terminal, the notification signal indicating that a voice message has been stored on the internet terminal, storing a voice message received from the internet terminal into a memory, the voice message being output by the internet terminal in response to the notification response, and notifying the user of the voice message stored in the memory.

Examples of the storing medium includes a floppy disk, a CD-ROM, or other recording media, and the programs stored in the storing medium are supplied to the telephone terminal itself, the computer system, or the user of this equipment. Such programs could be acquired via a communication network, such as the Internet.

Computer systems used to execute the above-described control programs can be, for example, a computer system built into the telephone terminal, a computer system connected to the telephone terminal via a wired or wireless communication path by which data communications is possible, or the like.

BRIEF DESCRIPTION OF THE DRAWINGS

In the drawings:

FIG. 21 is a flowchart representing a first multifunction device signal determination process according to the second embodiment of the present invention.

PREFERRED EMBODIMENTS OF THE PRESENT INVENTION

Next, an internet telephone system according to embodiments of the present invention will be described with reference to the accompanying drawings.

Figure 1:
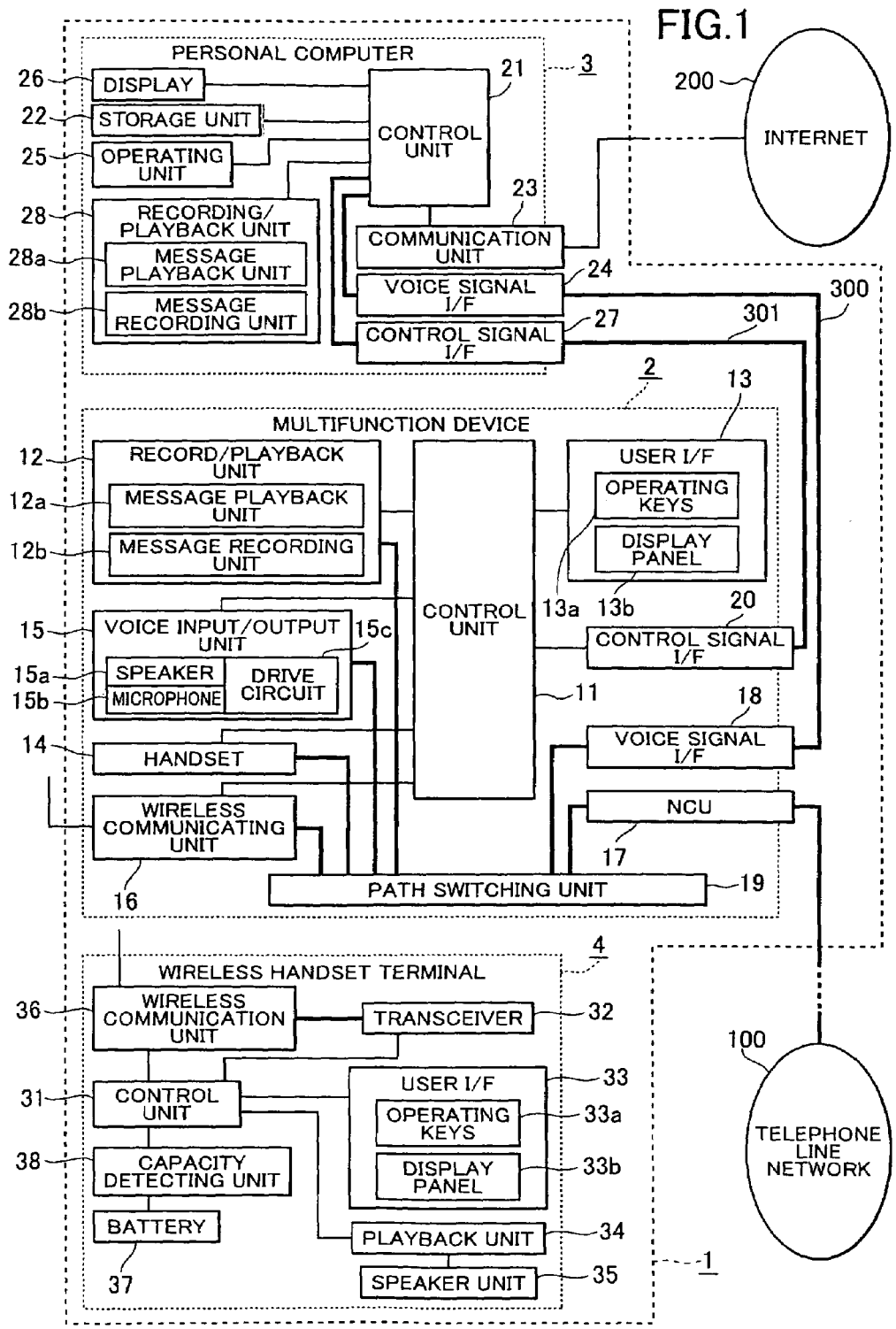
FIG. 1 is a block diagram of an internet calling system according to an embodiment of the present invention.

As shown in FIG. 1, an internet telephone system 1 according to a first embodiment includes a multifunction device 2 and a personal computer (PC) 3 connected to the multifunction device 2 by an audio cable 300 and a control signal cable 301.

The multifunction device 2 has a telephone terminal function for performing voice calls based on voice signals transmitted via a telephone line network 100. The PC 3 is capable of performing data communications via an internet 200. The audio cable 300 transmits voice signals, and the control signal cable 301 transmits control signals. The control signal cable 301 can be any cable that transmits control signals. Examples of the control signal cable 301 include a USB (universal serial bus) cable, a serial cable, a Centronics cable, and an IEEE 1394 cable. Examples of the control signals include an internet-call ring signal, an internet call response signal, a recorded internet-call notification, and the like to be described later.

The multifunction device 2 includes a control unit 11, a record/playback unit 12, a user interface (I/F) 13, a handset 14, a voice input/output unit 15, a wireless communicating unit 16, a network control unit (NCU) 17, a voice signal I/F 18, a path switching unit 19, a control signal I/F 20, and a wireless handset terminal 4.

The control unit 11 controls the overall operations of the multifunction device 2. The record/playback unit 12 records and plays back voice sound based on various voice signals. The handset 14 functions as a transceiver when lifted off a main case (not shown) of the multifunction device 2. The wireless communicating unit 16 transmits and receives various signals, such as voice signals, to and from the handset terminal 4 using wireless communication. The NCU 17 inputs and outputs voice signals transmitted via the telephone line network 100. The voice signal I/F 18 inputs and outputs voice signals transmitted via the audio cable 300. The control signal I/F 20 inputs and outputs control signals transmitted via the control signal cable 301. The wireless handset terminal 4 performs wireless communications with the wireless communicating unit 16.

The record/playback unit 12 includes a message playback unit 12a and a message recording unit 12b. The message playback unit 12a stores and plays back various audio signals for such sounds as ringing sounds used when receiving an incoming call, holding sounds used when temporarily suspending a voice call, and an outgoing answering message for informing a caller that an answering machine function will begin recording a message using the answering machine function and for prompting a caller to leave a message. The message recording unit 12b stores voice messages from a caller as voice signals. The message playback unit 12a plays back the voice messages stored in the message recording unit 12b also.

The user I/F 13 includes a plurality of operating keys 13a that the user can operate, and a display panel 13b for displaying various data.

The voice input/output unit 15 includes a speaker 15a, a microphone 15b, and a drive circuit 15c for driving the speaker 15a and the microphone 15b. The voice input/output unit 15 outputs voice sounds from the speaker 15a based on voice signals. In addition, the voice input/output unit 15 can perform what is known as hands-free calling while using the speaker 15a and the microphone 15b as a transceiver.

The path switching unit 19 switches a transmission path through which signals are inputted from and outputted to a device external to the multifunction device 2 between the NCU 17 and the voice signal I/F 18. Initially, the NCU 17 is selected as the transmission path. Also, the path switching unit 19 switches a source unit among the handset 14, the voice input/output unit 15, and the record/playback unit 12. The source unit is a unit that is connected to the transmission path (NCU 17 or voice signal I/F 18). That is, voice signals inputted from an external device through the transmission path is transmitted to the source unit, and voice signals outputted from the source unit is outputted externally via the transmission path.

Specifically, the path switching unit 19 switches the source unit to the handset 14 when the handset 14 is removed from the main body of the multifunction device 2, to the voice input/output unit 15 when a user operates the operating keys 13a for initiating a hands-free call, and to the wireless communicating unit 16 when the user operates operating keys 33a (described later) for initiating a call with the handset terminal 4. Here, removing the handset 14 from the main body of the multifunction device 2, operation on the operating keys 13a for initiating the hands-free call, and operation on the operating keys 33a for initiating a call with the handset terminal 4 are examples of off-hook operations. The path switching unit 19 switches the source unit to the record/playback unit 12 when any one of the off-hook operations was not performed within a prescribed time period after receiving an incoming call from the telephone line network 100 or when the user operates the operating keys 13a for initiating the answering-machine function.

When the record/playback unit 12 is set as the source unit, the control unit 11 controls the record/playback unit 12 to play back the outgoing answering message stored in the message playback unit 12a. As a result, voice signals for the outgoing answering message are outputted to a caller, which is a remote telephone terminal of another party, via the telephone line network 100. Afterwards, the message recording unit 12b records voice messages inputted via the telephone line network 100 from the caller.

The handset terminal 4 includes a control unit 31, a transceiver 32, a user I/F 33, a playback unit 34, a speaker unit 35, a wireless communication unit 36, a battery 37, and a capacity detecting unit 38. The control unit 31 controls the overall operations of the handset terminal 4. Although not shown in the drawings, the transceiver 32 includes a speaker, a microphone, and a drive circuit for driving the speaker and the microphone. The user I/F 33 includes a plurality of operating keys 33a including numeric keys, and a display panel 33b for displaying various information. The playback unit 34 stores audio signals for ringing sounds used when receiving incoming calls, for holding sounds used when temporarily suspending a voice call, and the like, and plays back audio sounds based on these audio signals. The speaker unit 35 includes a speaker for outputting voice sounds played back by the playback unit 34, and a drive circuit for driving the speaker (not shown). The wireless communication unit 36 transmits and receives various signals, such as voice signals, to and from the wireless communicating unit 16 through wireless communications. The battery 37 supplies power to the entire handset terminal 4. The capacity detecting unit 38 detects the remaining capacity of the battery 37.

The PC 3 includes a control unit 21, a storage unit 22, a communication unit 23, a voice signal I/F 24, an operating unit 25, a display 26, a control signal I/F 27, and a recording/ playback unit 28. The control unit 21 controls the overall operations of the PC 3. The storage unit 22 stores various data. The communication unit 23 connects the PC 3 to the internet 200. The voice signal I/P 24 inputs and outputs voice signals via the audio cable 300. The operating unit 25 includes a keyboard and a mouse not shown in the drawings. The control signal I/F 27 inputs and outputs control signals transmitted via the control signal cable 301.

The recording/playback unit 28 includes a message playback unit 28a and a message recording unit 28b. The message playback unit 28a stores audio signals for ringing sounds used when receiving an incoming call, outgoing answering messages for informing a caller that the answering machine function will begin recording a message, and the like, and also plays back audio sounds based on these audio signals. The message recording unit 28b records voice messages from a caller as voice signals using the answering machine function.

The PC 3 has internet calling functions, which are implemented by executing an internet call initiating process, an internet call transmission/reception process, and an internet call termination process described below according to a procedure specified by application software (hereinafter referred to as "calling software") stored in the storage unit 22.

The internet call initiating process initiates data communications with a remote internet terminal by establishing a connection (a logical communication path) with the remote internet terminal, which is capable of performing data communications via the internet 200 and which must have the same calling software loaded. This call initiating process is executed when the user indicates an internet terminal of another party by operating the operating keys 33a or the like while the calling software is running.

The internet call transmission/reception process generates data in units of packets based on voice signals and transmits this data via the communication unit 23 and the internet 200 to the remote internet terminal with which a connection has been established. The transmission/reception process also generates voice signals based on data in units of packets received via the internet 200 and the communication unit 23 from the remote internet terminal with which the connection has been established. In this embodiment, the internet call transmission/reception process further generates data in units of packets based on voice signals inputted from the multifunction device 2 via the audio cable 300 and the voice signal I/F 24. Moreover, voice signals generated based on data in units of packets are outputted to the multifunction device 2 via the voice signal I/F 24 and the audio cable 300. The internet call transmission/reception process is executed repeatedly after the internet call initiation process is executed and until the internet call termination process is executed. In this way, a voice call is implemented between the PC 3 (or the multifunction device 2 connected to the PC 3) and an internet terminal of the other party connected via the internet 200.

The internet call termination process ends a voice call using the internet calling functions by disconnecting the internet terminal of the other party to which a connection has been established (breaking the logical communication path). This call terminating process is executed when the user operates the operating keys 33a or the like to end the internet call. Here, when the user operates the operating keys 33a or the like to end the internet call, the call terminating process transmits a disconnect signal from an internet terminal in which the internet calling software is loaded to an internet terminal of the other party to which a connection has been established, notifying the other party of the disconnection. The PC 3 also executes the call terminating process upon receiving a disconnect signal from the internet terminal of the other party to which a connection has been established.

While a detailed description will be omitted, the telephone line connecting the NCU 17 to the telephone line network 100 is also used for a portion of a communication path from the communication unit 23 of the PC 3 to the internet 200 (segment from the user side to the telephone exchange side). In this segment of the communication path, voice signals transmitted via the telephone line network 100 are superimposed on data transmitted via the internet 200 using ADSL (asymmetric digital subscriber line) technology.

First Incoming Call Process

Figure 2:
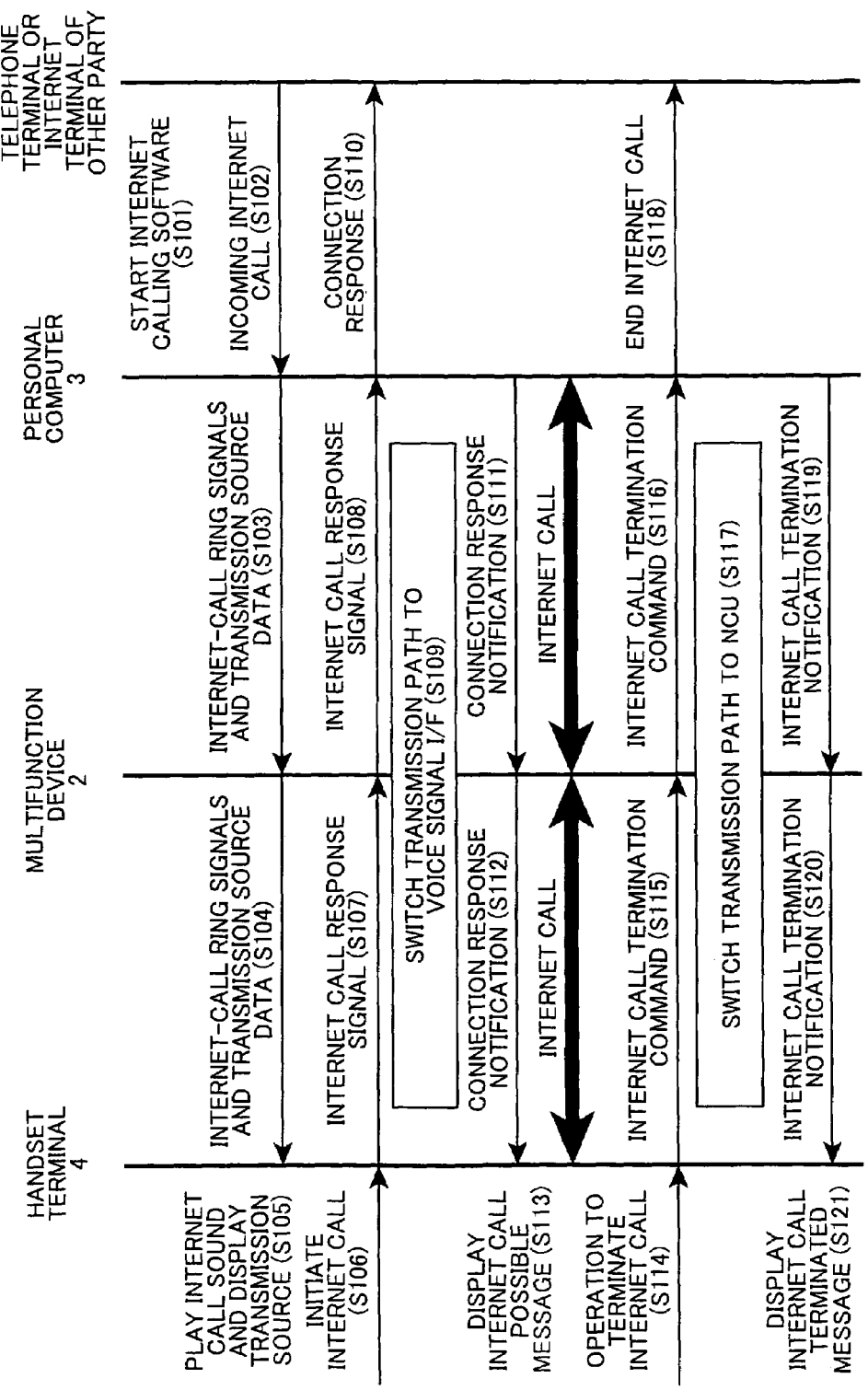
FIG. 2 is a sequence diagram showing a first incoming call process executed by the internet calling system of a first embodiment of the present invention.

Next, a first incoming call process will be described with reference to FIG. 2. The first incoming call process is executed by the internet telephone system 1 when the multifunction device 2 is connected to the PC 3 via the control signal I/F 20 and the control signal I/F 27.

In S101, the user of the internet telephone system 1 starts the internet calling software by operating the operating unit 25 on the PC 3. By starting the internet calling software, the user can receive internet call requests from other internet terminals. When an incoming internet call from a remote internet terminal is received by the PC 3 in S102, the PC 3 transmits internet-call ring signals and transmission source data to the multifunction device 2 in S103.

After receiving the internet-call ring signals and the transmission source data, the multifunction device 2 transmits the internet-call ring signals and the transmission source data to the handset terminal 4 in S104. After receiving the internet-call ring signals and the transmission source data, the handset terminal 4 notifies the user of an incoming call in S105 by playing an incoming internet call sound (ringing sound), and displays the transmission source data on the display panel 33b.

Having learned of the incoming call, the user of the internet telephone system 1 operates the operating keys 33a of the handset terminal 4 to execute the internet call initiating process in S106. Then, in S107, the handset terminal 4 transmits an internet call response signal to the multifunction device 2. After receiving the internet call response signal, the multifunction device 2 relays the internet call response signal to the PC 3 in S108. In S109, the path switching unit 19 of the multifunction device 2 switches the transmission path to the voice signal I/F 18.

After receiving the internet call response signal, the PC 3 executes the internet call initiating process, thereby initiating data communications with the remote internet terminal and transmits a connection response to the remote internet terminal in S110. In addition, the PC 3 transmits a connection response notification to the remote multifunction device 2 in S111.

After receiving the connection response notification, the multifunction device 2 relays the connection response notification to the handset terminal 4 in S112. After receiving the connection response notification, the handset terminal 4 notifies the user of the internet telephone system 1 that conversation is possible by displaying a message to this effect on the display panel 33b in S113. The internet call transmission/reception process is executed, whereby voice inputted through the transceiver 32 of the handset terminal 4 is outputted to the multifunction device 2 via the wireless communication unit 36 and subsequently outputted to the PC 3 via the voice signal I/F 18, and voice inputted from the PC 3 to the multifunction device 2 via the voice signal I/F 18 is outputted to the transceiver 32 of the handset terminal 4 via the wireless communicating unit 16, enabling an internet call using the handset terminal 4.

When the user of the internet telephone system 1 subsequently operates the operating keys 33a to perform the internet call termination process in S114, the handset terminal 4 transmits an internet call termination command to the multifunction device 2 in S115. After receiving the internet call termination command, the multifunction device 2 relays the internet call termination command to the PC 3 in S116. In S117, the path switching unit 19 switches the transmission path to the NCU 17.

After receiving the internet call termination command, the PC 3 ends the internet call in S118 and transmits an internet call termination notification to the multifunction device 2 in S119. After receiving the internet call termination notification, the multifunction device 2 relays the internet call termination notification to the handset terminal 4 in S120. After receiving the internet call termination notification, the handset terminal 4 displays a message on the display panel 33b in S121 indicating that the internet call has been terminated.

In the above-described first incoming call process, the path switching unit 19 switches the transmission path to the voice signal I/F 18 in S109 after the internet call response signal is received in S107. However, this switching process can be performed at any time after the internet call initiating process is executed in S106 until the message indicating that conversation is possible is displayed in S113. For example, the path switching unit 19 can switch the transmission path to the voice signal I/F 18 after the connection response notification is received in S111.

Similarly, in the above-described first incoming call process, the path switching unit 19 switches the transmission path to the NCU 17 in S117 after the internet call termination command is received in S115. However, the switching operation can be performed at any time after the user operates to perform the internet call termination process in S114 until the message indicating the internet call has been terminated is displayed in S121. For example, the path switching unit 19 can switch the transmission path to the NCU 17 after the internet call termination notification is received in S119.

Second Incoming Call Process

Figure 3:
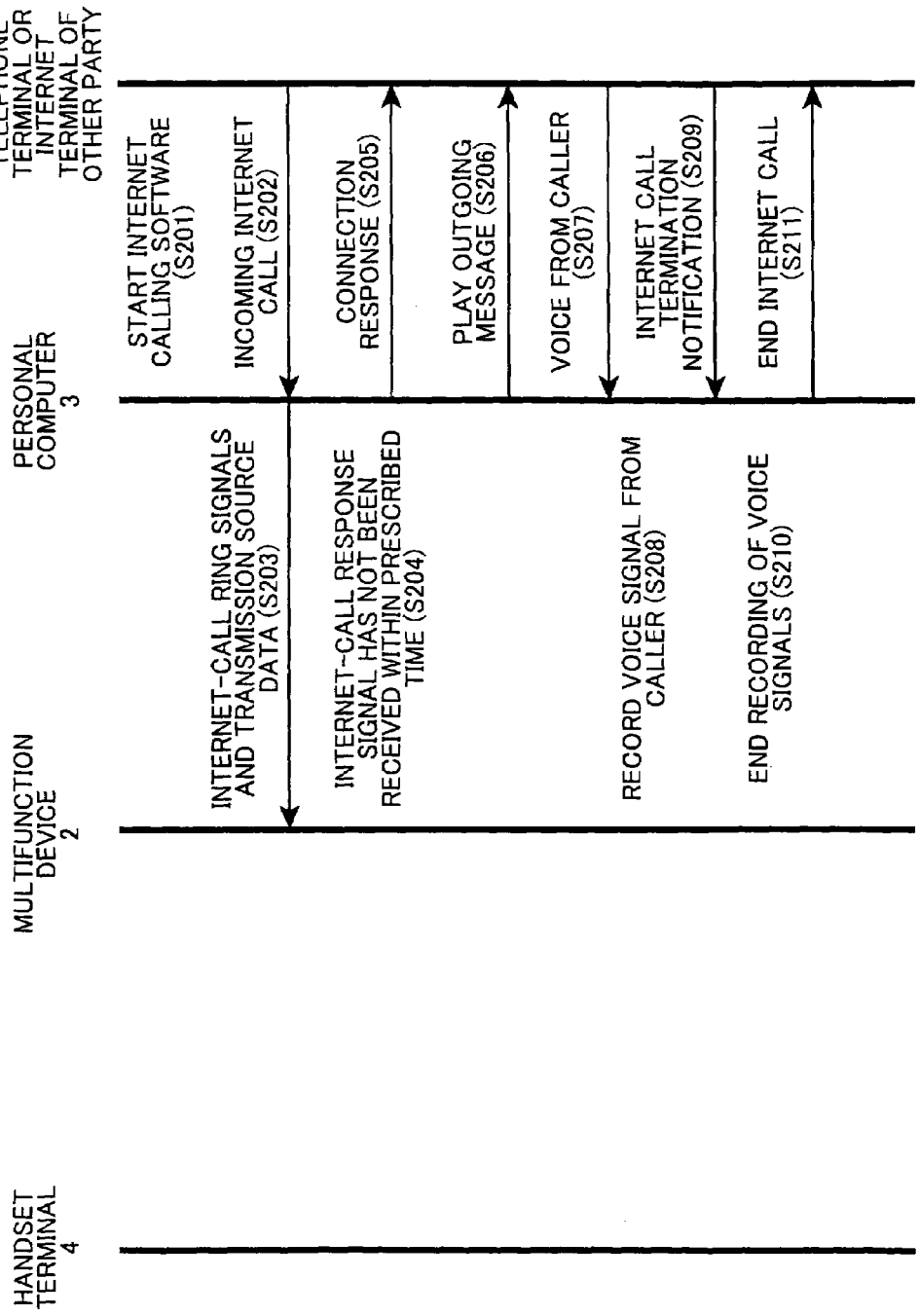
FIG. 3 is a sequence diagram showing a second incoming call process executed by the internet calling system of the first embodiment of the present invention.

Next, a second incoming call process will be described with reference to FIG. 3. The second incoming call process is executed by the internet telephone system 1 when the multifunction device 2 is not connected to the PC 3 via the control signal I/F 20 and the control signal I/F 27.

In S201, the user of the internet telephone system 1 starts the internet calling software by operating the operating unit 25 on the PC 3. By starting the internet calling software, the user can receive requests for an internet call from another internet terminal. If a request for an internet call is received from a remote internet terminal by the PC 3 in S202, then the PC 3 transmits internet-call ring signals and transmission source data to the multifunction device 2 in S203.

However, since the multifunction device 2 is not connected to the PC 3 via the control signal I/Fs 20 and 27, the PC 3 does not receive an internet call response signal from the multifunction device 2.

If the PC 3 determines in S204 that an internet call response signal has not been received within a prescribed time period (10 seconds, for example) after the incoming internet call was received, then in S205, the PC 3 executes the internet call initiating process to initiate data communications with the remote internet terminal at the source of the incoming call and transmits a connection response to the remote internet terminal.

Then in S206, the PC 3 transmits voice signals for the outgoing answering message to the remote internet terminal of the other party indicating that the answering machine function will begin recording a message. In S207, voice signals are received from the remote internet terminal, and in S208, the PC 3 records these voice signals in the message recording unit 28b. In this manner, a voice message from the caller is stored in the message recording unit 28b. When the PC 3 subsequently receives an internet call termination notification from the remote internet terminal in S209, the PC 3 stops storing voice signals in the message recording unit 28b in S210 and ends the internet call in S211.

Message Notification Process

Figure 4:
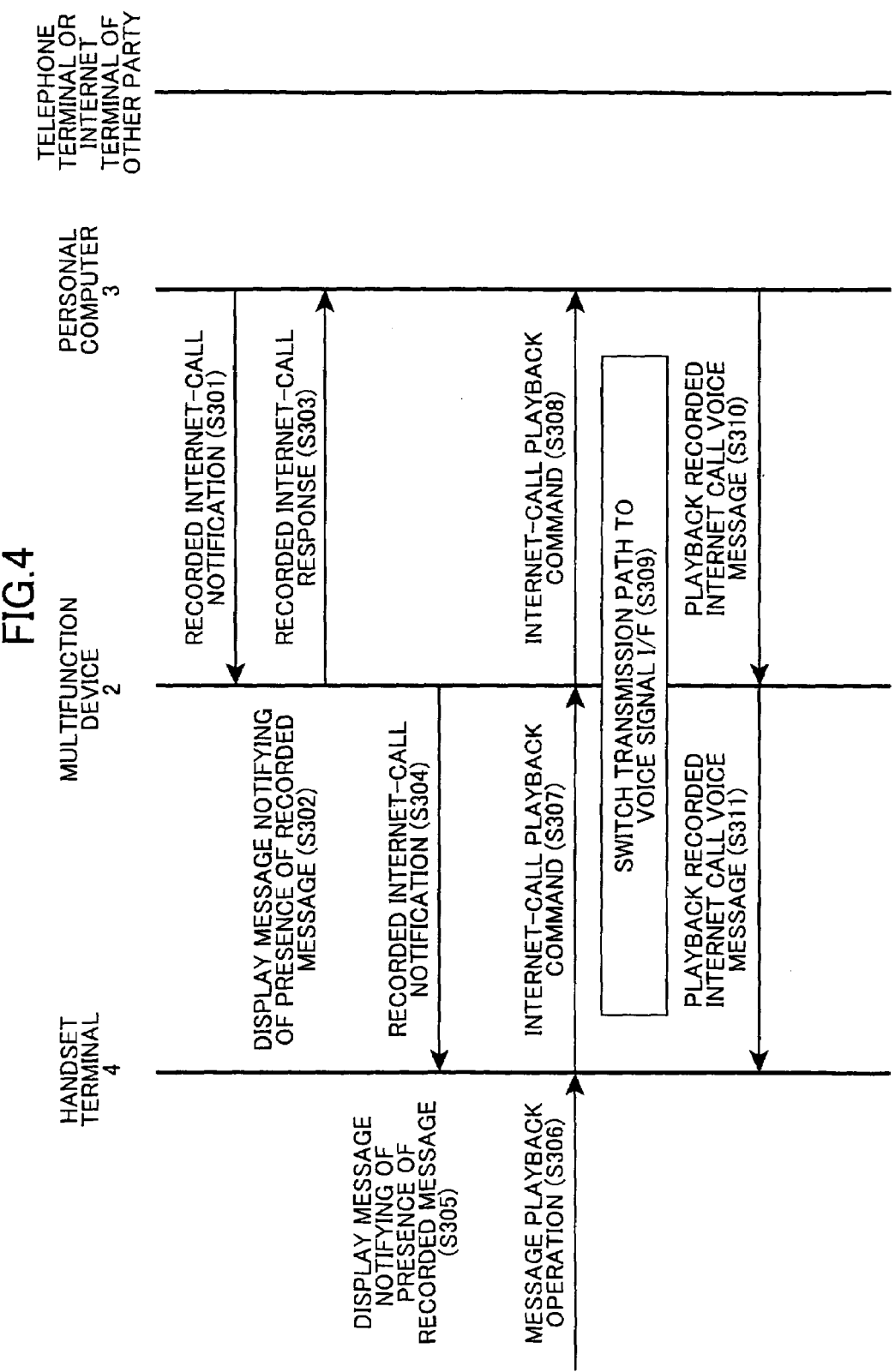
FIG. 4 is a sequence diagram showing a recorded message notification process executed by the internet calling system of the first embodiment of the present invention.

Next, a message notification process will be described with reference to FIG. 4. The message notification process is executed for notifying the user when a voice message from the remote internet terminal of another party has been stored in the message recording unit 28b of the PC 3. When a voice message from the remote internet terminal has been recorded in the message recording unit 28b of the PC 3, the PC 3 transmits a recorded internet-call notification to the multifunction device 2 in S301, indicating that an internet-call (message) has been recorded on the PC 3 in the user's absence. This notification is transmitted once every five minutes, for example, until a response to the recorded internet-call notification (hereinafter referred to as "recorded internet-call response") is received from the multifunction device 2.

When the multifunction device 2 is subsequently brought into connection with the PC 3 via the control signal I/Fs 20 and 27 and the multifunction device 2 receives the recorded internet-call notification, the multifunction device 2 displays a message in the display panel 13b in S302 indicating that a message has been recorded, and in S303 transmits a recorded internet-call response to the PC 3. In S304, the multifunction device 2 relays the recorded internet-call notification to the handset terminal 4. After receiving the recorded internet-call notification, the handset terminal 4 displays a message in the display panel 33b in S305 indicating that a message has been recorded.

After learning of the recorded message, the user of the internet telephone system 1 operates the operating keys 33a to perform a message playback operation in S306. In S307, the handset terminal 4 transmits an internet-call playback command to the multifunction device 2. After receiving the internet-call playback command, the multifunction device 2 relays the internet-call playback command to the PC 3 in S308. In S309, the path switching unit 19 of the multifunction device 2 switches the transmission path to the voice signal I/F 18.

After receiving the internet-call playback command, the PC 3 outputs in S310 the voice message stored in the message recording unit 28b to the multifunction device 2 via the voice signal I/F 24. The voice message inputted from the PC 3 to the multifunction device 2 via the voice signal I/F 18 is outputted to the transceiver 32 of the handset terminal 4 via the wireless communicating unit 16 in S311. Therefore, the recorded voice message can be heard from the transceiver 32 of the handset terminal 4.

Here, the above-described first incoming process, the second incoming process, and the message notification process are realized by first, second, and third internet call processes described next.

First Internet Calling Process

Next, the first internet calling process will be described with reference to FIGS. 5 to 10. The first internet calling process is repeatedly executed by the control unit 11 while the power to the multifunction device 2 is ON.

Figure 5:
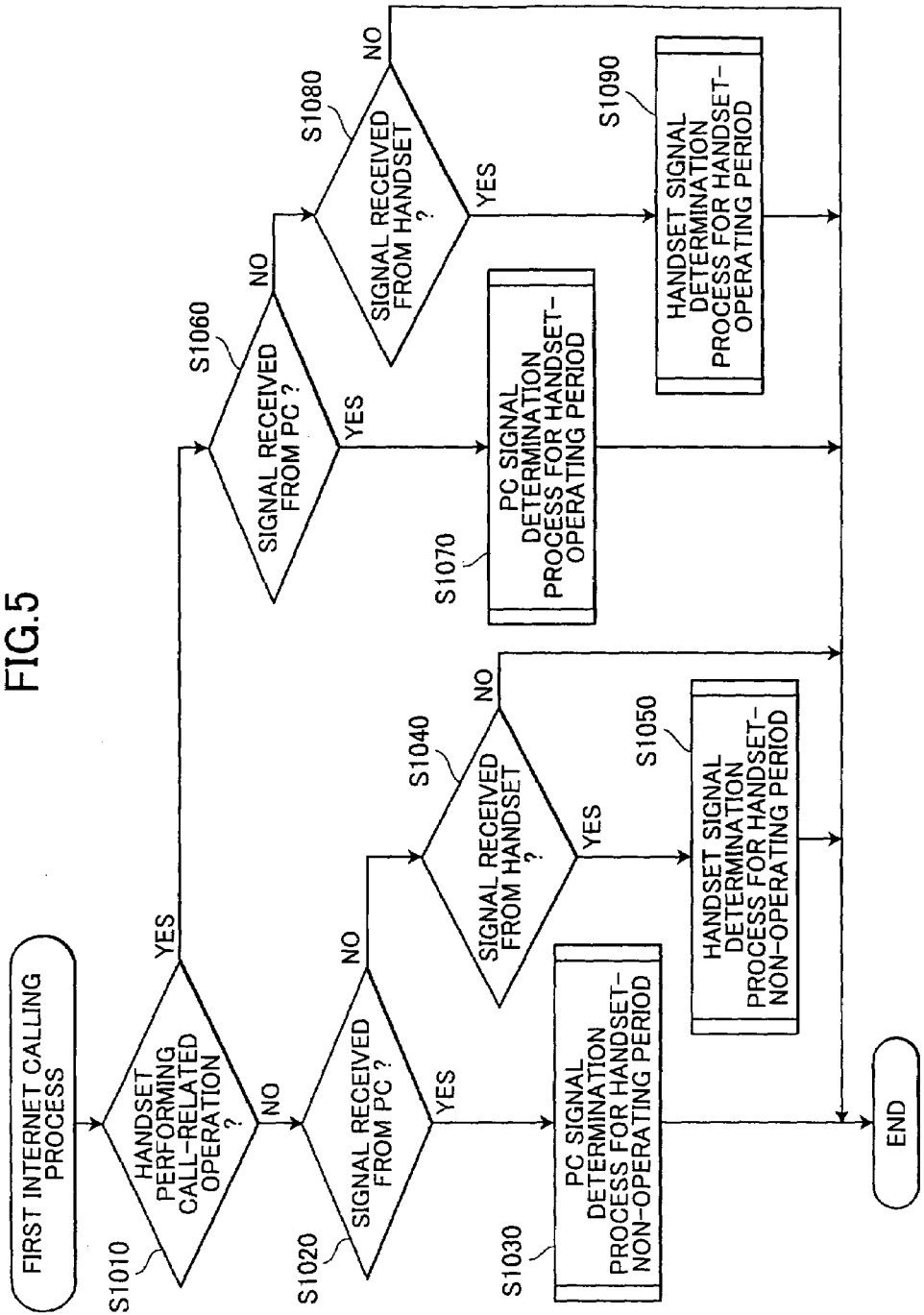
FIG. 5 is a flowchart representing a first internet calling process executed according to the first embodiment of the present invention.

At the beginning of the first internet calling process shown in FIG. 5, the control unit 11 determines in S1010 whether or not a call-related operation (for an internet call or the like) is being performed using the handset terminal 4. Since the method for this determination is well known in the art, a description of the method will be omitted. If a call-related operation is not being performed using the handset terminal 4 (S1010:NO), then in S1020, the control unit 11 determines whether or not a signal has been received from the PC 3. If a signal has been received (S1020:YES), then in S1030, the control unit 11 executes a PC signal determination process for handset-non-operating period After completing the PC signal determination process for handset-non-operating period, the control unit 11 ends the internet calling process.

The PC signal determination process for handset-non-operating period will be described with reference to the flowchart of FIG. 6. In S1210, the control unit 11 determines whether or not the signal is the internet-call ring signal. If so (S1210:YES), then in S1220, the control unit 11 executes an incoming call receiving process. After completing the incoming call receiving process, the control unit 11 ends the PC signal determination process for handset-non-operating period.

Figure 7:
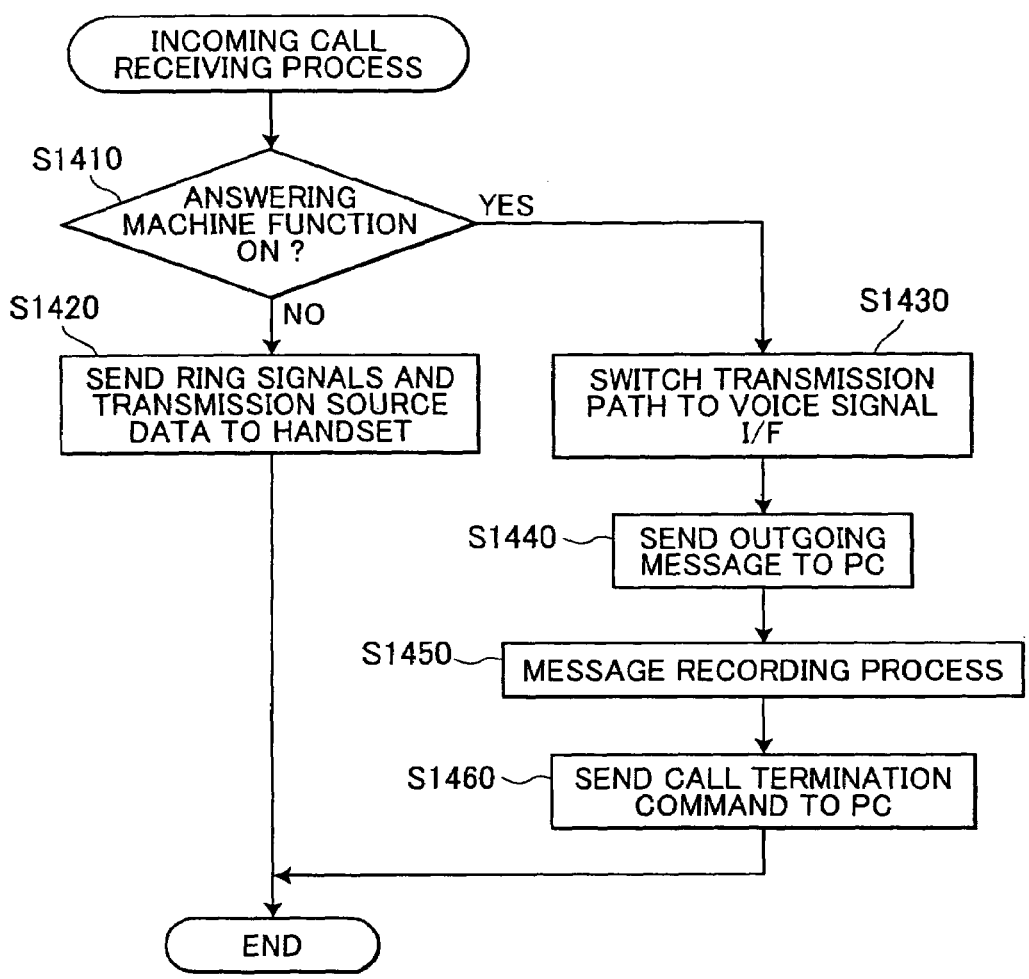
FIG. 7 is a flowchart representing an incoming call receiving process that is executed in S1220 of FIG. 6.

The incoming call receiving process will be described with reference to the flowchart of FIG. 7. In S1410, the control unit 11 determines whether or not the answering machine function is ON. Here, in the internet telephone system 1 of the present embodiment, the user can turn ON the answering machine function by pressing an answering machine key (not shown) provided among the operating keys 13a or the operating keys 33a. The answering machine function remains ON until the user disables the answering machine function by again pressing the answering machine key.

If the answering machine function is not ON (S1410:NO), then in S1420, the control unit 11 transmits the internet-call ring signals and transmission source data to the handset terminal 4 and subsequently ends the incoming call receiving process. On the other hand, if the answering machine function is ON (S1410:YES), then in S1430, the path switching unit 19 switches the transmission path to the voice signal I/F 18. In S1440, the message playback unit 12a transmits the outgoing answering message, indicating that the answering machine function will begin recording a message, to the PC 3 via the voice signal I/F 18. In S1450, the control unit 11 performs a message recording process for recording voice signals transmitted from the transmission source via the voice signal I/F 18 in the message recording unit 12b. After completing the message recording process, the control unit 11 transmits the internet call termination command to the PC 3 in S1460 and ends the incoming call receiving process.

Figure 6:
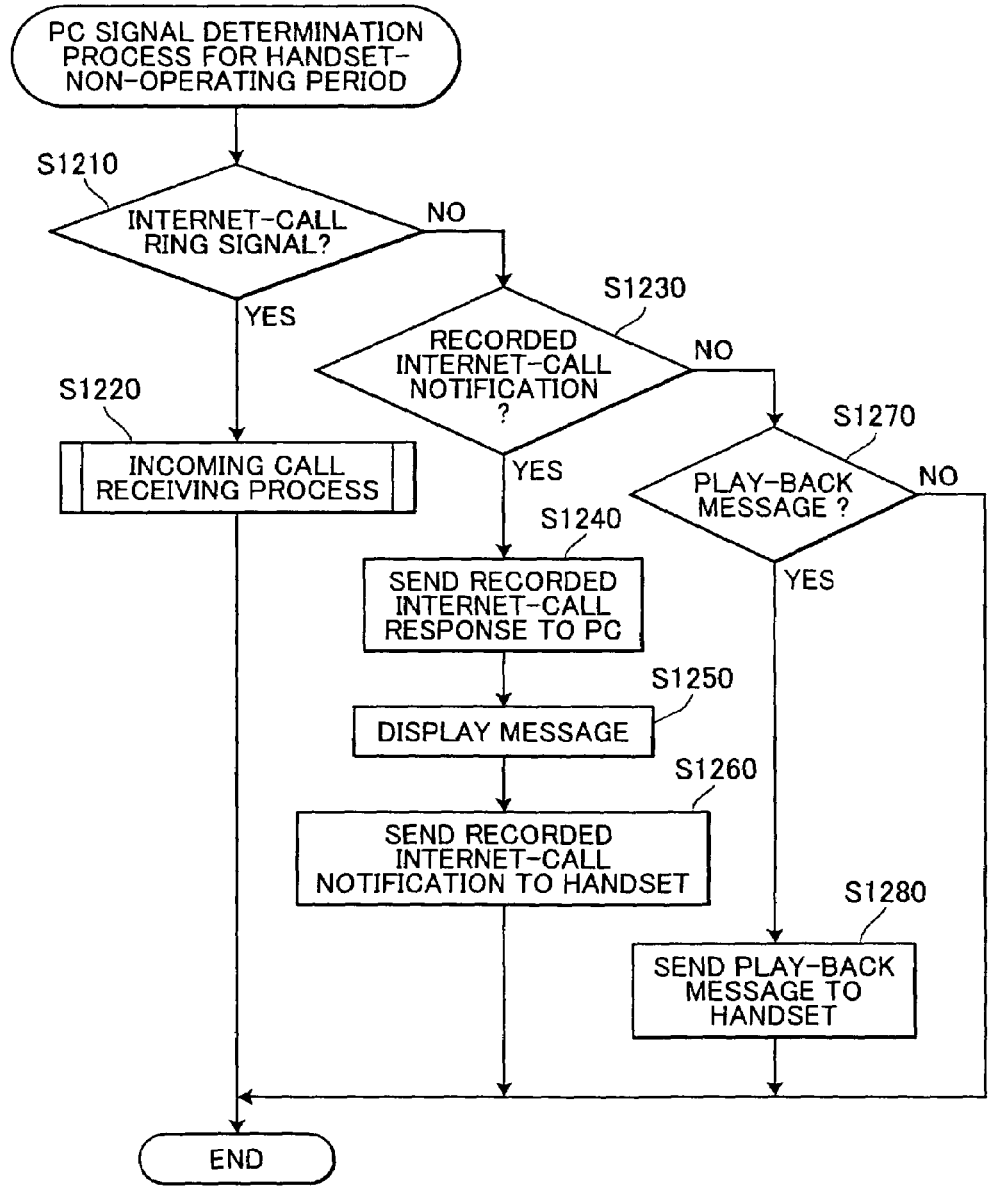
FIG. 6 is a flowchart representing a PC signal determination process for handset-non-operating period that is executed in S1030 of FIG. 5.

In S1210 of FIG. 6, if it is determined that the signal is not the internet-call ring signal (S1210:NO), then in S1230, the control unit 11 determines whether or not the signal is the recorded internet-call notification. If so (S1230:YES), then in S1240, the control unit 11 transmits the recorded internet-call response to the PC 3. In S1250, the control unit 11 performs a message display process to display a message on the display panel 13b indicating that there is a recorded message. After completing the message display process, the control unit 11 transmits the recorded internet-call notification to the handset terminal 4 in S1260, and ends the PC signal determination process for handset-non-operation period.

On the other hand, if the signal is not the recorded internet-call notification (S1230:NO), then the control unit 11 determines in S1270 whether or not the signal is a play-back message which is a voice signal. If so, (S1271:YES), then the control unit sends the play-back message to the handset terminal 4 in S1280 and ends the PC signal determination process for handset-non-operation period. If the signal is not a play-back message (S1270:NO), then the control unit 11 ends the PC signal determination process for handset-non-operation period.

Returning to S1020 in FIG. 5, if the control unit 11 determines that a signal has not been received from the PC 3 (S1020:NO), then in S1040, the control unit 11 determines whether or not a signal has been received from the handset terminal 4. If a signal has been received from the handset terminal 4 (S1040:YES), then in S1050, the control unit 11 executes a handset signal determination process for handset-non-operating period. After completing this process, the control unit 11 ends the first internet calling process.

Figure 8:
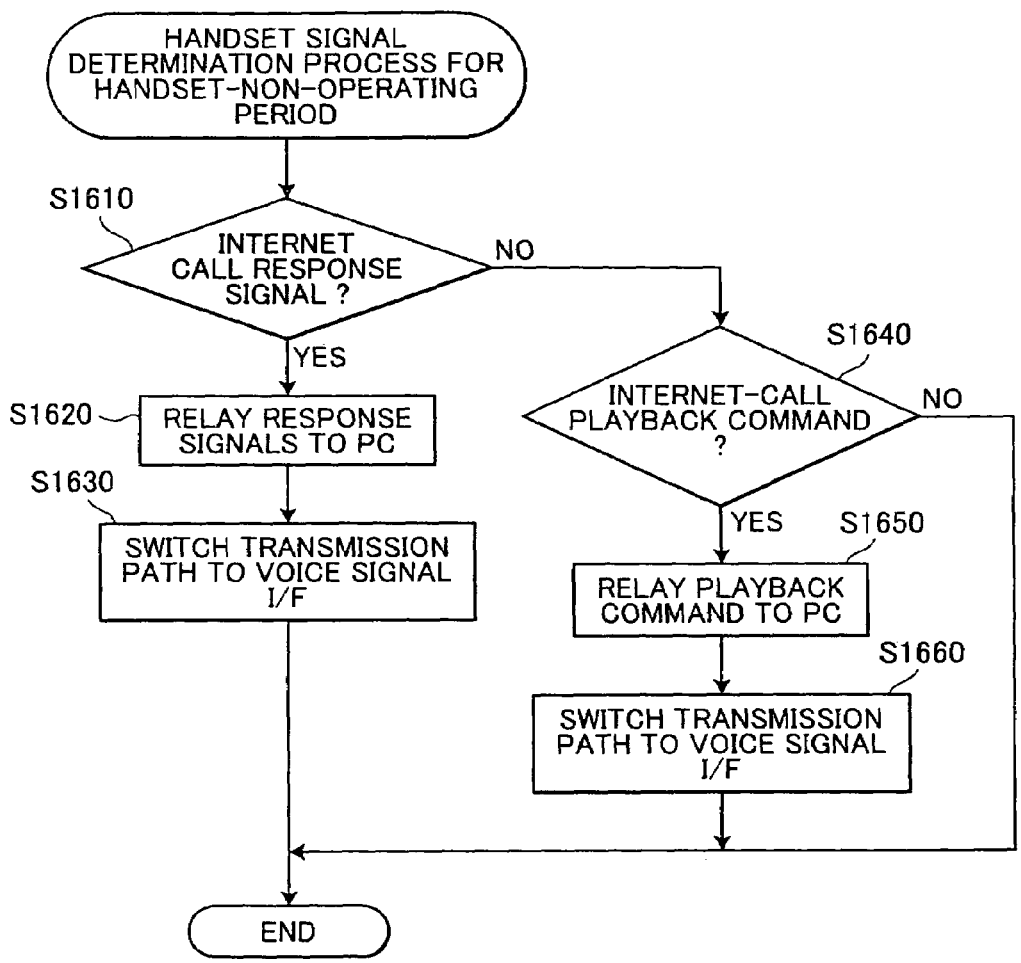
FIG. 8 is a flowchart representing a handset signal determination process for handset-non-operating period that is executed in S1050 of FIG. 5.

The handset signal determination process for handset-non-operating period will be described with reference to the flowchart of FIG. 8. In S1610, the control unit 11 determines whether or not the signal is the internet call response signal. If so (S1610:YES), then in S1620, the control unit 11 relays the internet call response signal to the PC 3. In S1630, the path switching unit 19 switches the transmission path to the voice signal I/F 18, and the control unit 11 ends the handset signal determination process for handset-non-operating period.

On the other hand, if the signal is not the internet call response signal (S1610:NO), then in S1640, the control unit 11 determines whether or not the signal is the internet-call playback command. If so (S1640:YES), then in S1650, the control unit 11 relays the internet-call playback command to the PC 3. In S1660, the path switching unit 19 switches the transmission path to the voice signal I/F 18, and the control unit 11 ends the handset signal determination process for handset-non-operating period.

If it is determined in S1640 that the signal is not the internet-call playback command (S1640:NO), then the control unit 11 ends the handset signal determination process for handset-non-operating period Returning to S1040 in FIG. 5, if a negative determination is made in S1040 (S1040:NO), then the control unit 11 ends the first internet calling process.

If the control unit 11 determines in S1010 that the handset is performing a call-related operation (S1010:YES), then in S1060, the control unit 11 determines whether or not a signal has been received from the PC 3. If so (S1060:YES), then in S1070, the control unit 11 executes a PC signal determination process for handset-operating period. After completing the PC signal determination process for handset-operating period, the control unit 11 ends the first internet calling process.

Figure 9:
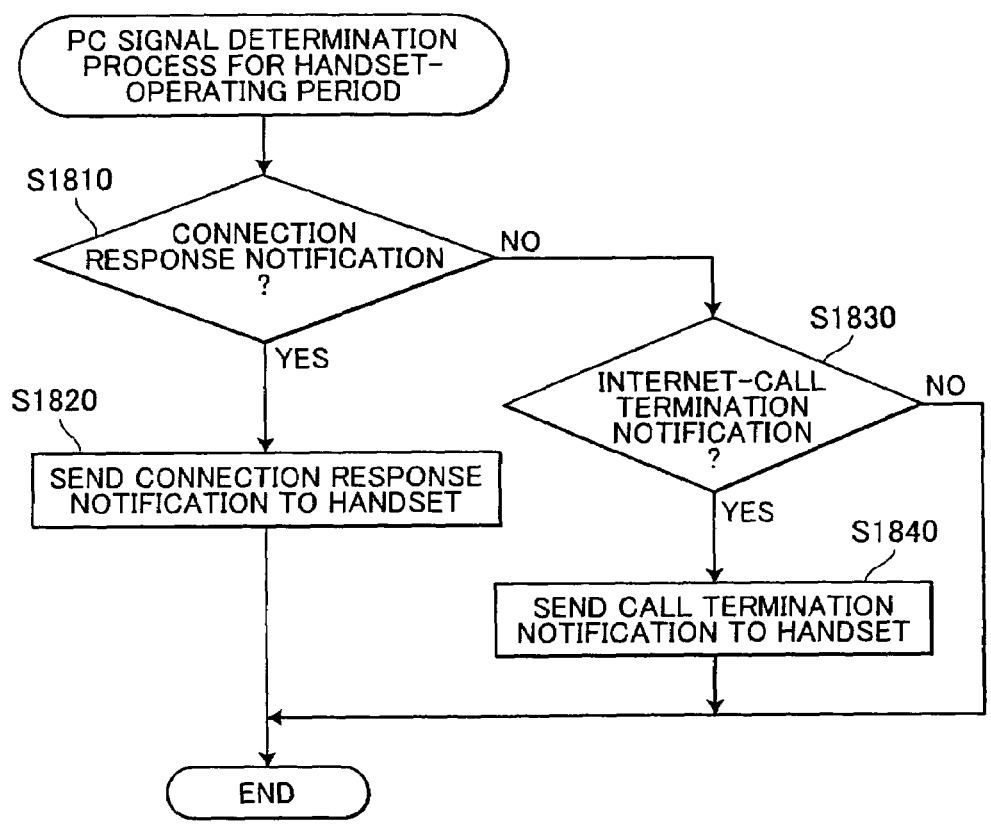
FIG. 9 is a flowchart representing a PC signal determination process for handset-operating period that is executed in S1070 of FIG. 5.

The PC signal determination process for handset-operating period will be described with reference to the flowchart of FIG. 9. In S1810, the control unit 11 determines whether or not the signal is the connection response notification. If so (S1810:YES), then in S1820, the control unit 11 relays the connection response notification to the handset terminal 4 and then ends the PC signal determination process for handset-operating period.

On the other hand, if the signal is not the connection response notification (S1810:NO), then in S1830, the control unit 11 determines whether or not the signal is the internet call termination notification. If so (S1830:YES), then in S1840, the control unit 11 relays the internet call termination notification to the handset terminal 4 and ends the PC signal determination process for handset-operating period.

If it is determined in S1830 that the signal is not the internet call termination notification (S1830:NO), then the control unit 11 ends the PC signal determination process for handset-operating period.

Returning to S1060 in FIG. 5, if the control unit 11 determines that a signal has not been received from the PC 3 (S1060:NO), then in S1080, the control unit 11 determines whether or not a signal has been received from the handset terminal 4 If so (S1080:YES), then in S1090, the control unit 11 executes a handset signal determination process for handset-operating period. After completing this process, the control unit 11 ends the first internet calling process.

Figure 10:
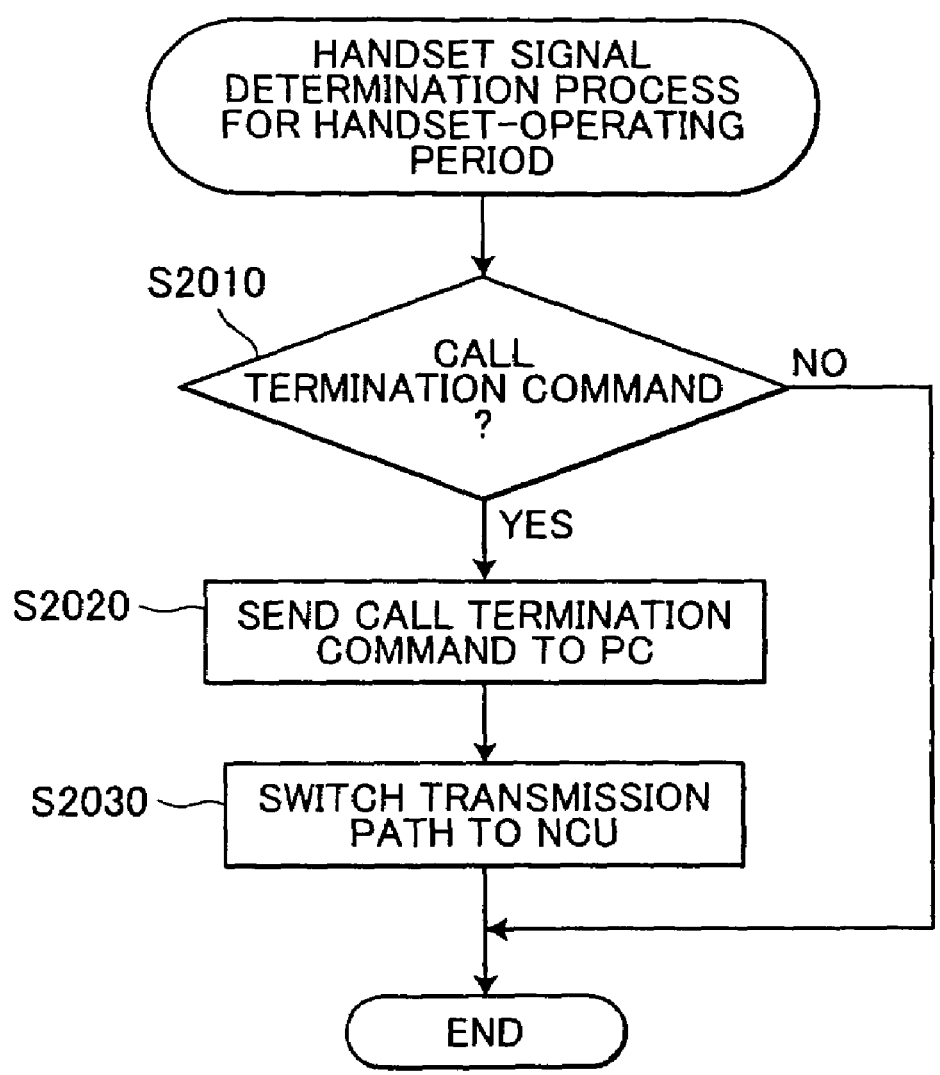
FIG. 10 is a flowchart representing a handset signal determination process for handset-operating period that is executed in S1090 of FIG. 5.

The handset signal determination process for handset-operating period will be described with reference to the flowchart of FIG. 10. In S2010, the control unit 11 determines whether or not the signal is the internet call termination command. If so (S2010:YES), then in S2020, the control unit 11 relays the internet call termination command to the PC 3. In S2030, the path switching unit 19 switches the transmission path to the NCU 17, and the control unit 11 ends the handset signal determination process for handset-operating period. On the other hand, if the signal is not the internet call termination command (S2010:NO), then the control unit 11 ends the handset signal determination process for handset-operating period.

Returning to S1080 of FIG. 5, if the control unit 11 determines that a signal has not been received from the handset terminal 4 (S1080:NO), then the control unit 11 ends the first internet calling process.

Second Internet Calling Process

Figure 11:
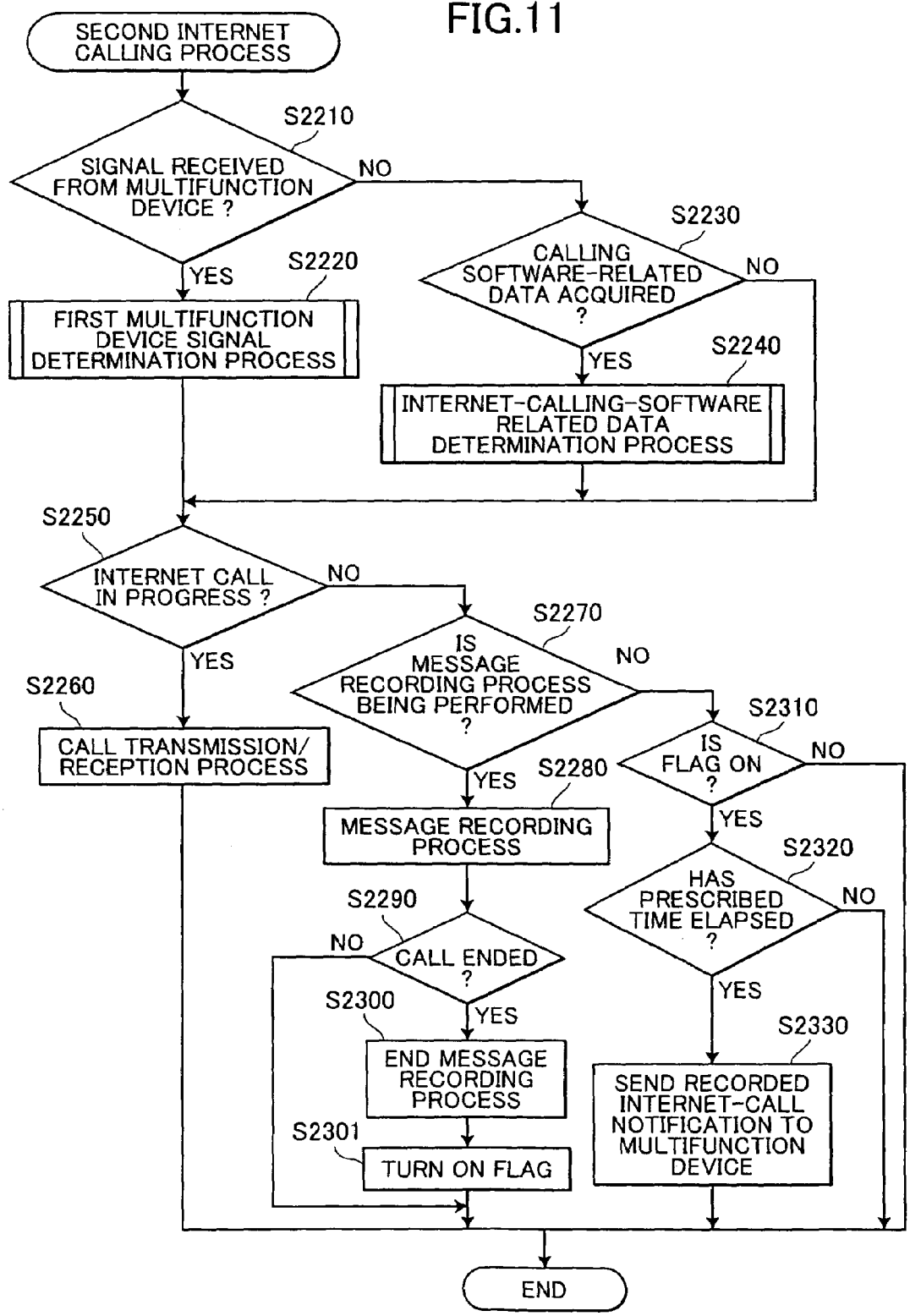
FIG. 11 is a flowchart representing a second internet calling process according to the first embodiment of the present invention.
Figure 12:
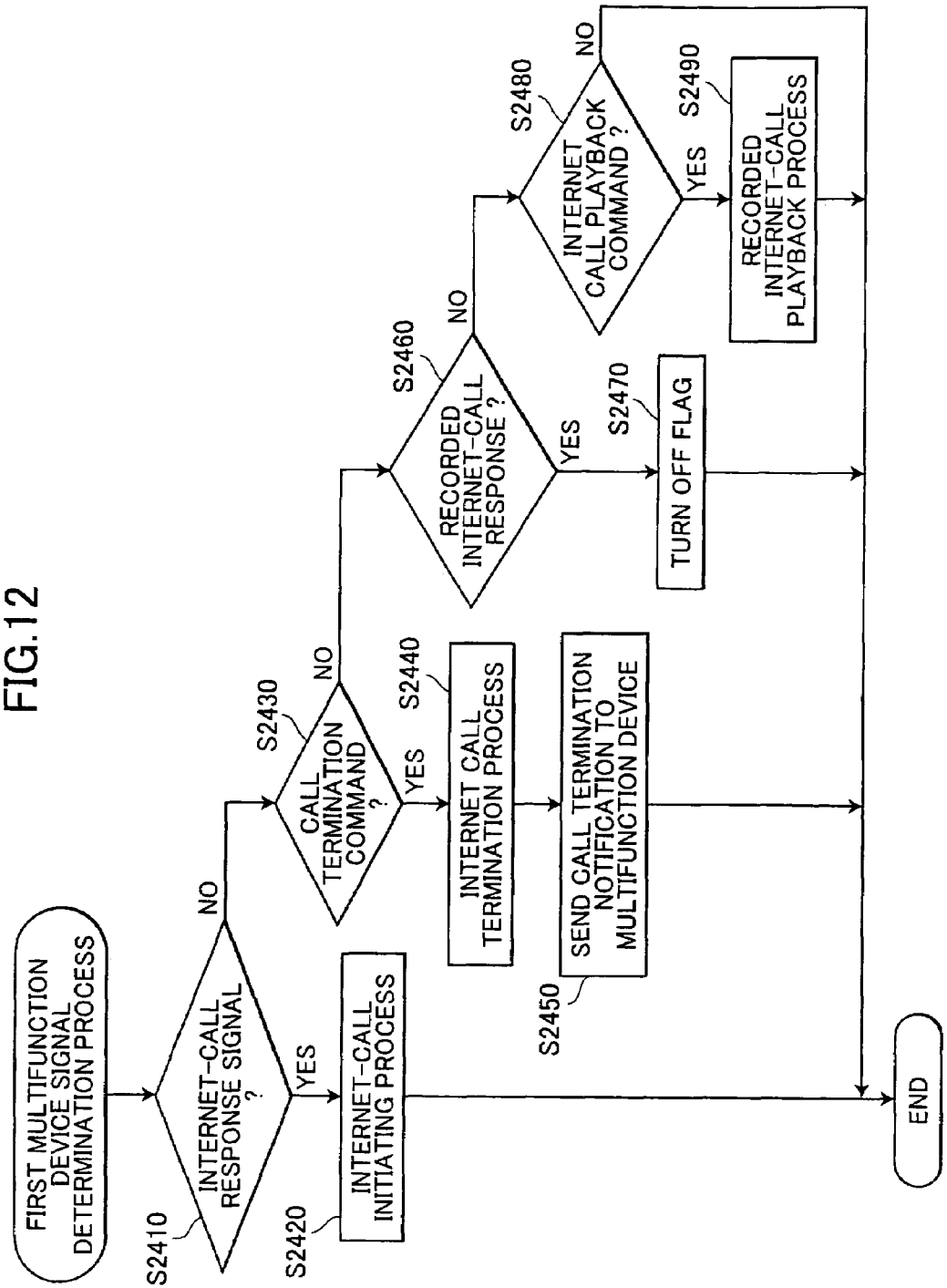
FIG. 12 is a flowchart representing a first multifunction device signal determination process that is executed in S2220 of FIG. 11.

Next, the second internet calling process will be described with reference to FIGS. 11 through 13. The second internet calling process is repeatedly executed by the control unit 21 of the PC 3 while the power to the PC 3 is ON. At the beginning of the second internet calling process in FIG. 11, the control unit 21 determines in S2210 whether or not a signal has been received from the multifunction device 2. If so (S2210:YES), then in S2220, the control unit 21 executes a first multifunction device signal determination process. After completing this process, the process proceeds to S2250.

The first multifunction device signal determination process will be described with reference to the flowchart of FIG. 12. In S2410, the control unit 21 determines whether or not the signal is the internet call response signal. If so (S2410:YES), then the control unit 21 executes the internet call initiating process in S2420 and ends the first multifunction device signal determination process. On the other hand, if the signal is not the internet call response signal (S2410:NO), then in S2430, the control unit 21 determines whether or not the signal is the internet call termination command. If so (S2430:YES) then in S2440, the control unit 21 performs the internet call termination process. That is, the control unit 21 ends the voice call using the internet calling functions by breaking the connection with the internet terminal with which a connection has been established (disconnecting the logical communication path). After completing the internet call termination process, the control unit 21 transmits the internet call termination notification to the multifunction device 2 in S2450 and ends the first multifunction device signal determination process.

If the signal is not the internet call termination command (S2430:NO), then in S2460, the control unit 21 determines whether or not the signal is the recorded internet-call response. If so (S2460:YES), then in S2470, the control unit 21 turns OFF a message flag and ends the first multifunction device signal determination process.

If it is determined in S2460 that the signal is not the recorded internet-call response (S2460:NO), then in S2480, the control unit 21 determines whether or not the signal is the internet-call playback command. If so (S2480:YES) then in S2490, the control unit 21 performs a recorded internet-call playback process, where the message playback unit 28a outputs a voice message based on the voice signals stored in the message recording unit 28b to the voice signal I/F 24. On the other hand, if a negative determination is made in S2480 (S2480:NO), then the control unit 21 ends the first multifunction device signal determination process.

Returning to FIG. 11, if the control unit 21 determines in S2210 that a signal has not been received from the multifunction device 2 (S2210:NO), then in S2230, the control unit 21 determines whether or not data related to internet calling software has been acquired. If so (S2230:YES), then in S2240, the control unit 21 executes an internet-calling-software related data determination process. After completing this process, the present process proceeds to S2250.

The internet-calling-software related data determination process will be described with reference to the flowchart of FIG. 13. In S2610, the control unit 21 determines whether or not there is an incoming call from another party. If so (S2610:YES), then in S2620, the control unit 21 transmits the internet-call ring signals and transmission source data to the multifunction device 2. In S2630, the control unit 21 determines whether or not a prescribed time has elapsed since the beginning of the incoming call. If so (S2630:YES), then the process proceeds to S2640, where the control unit 21 performs the internet call initiating process.

In S2650, the message playback unit 28a outputs the outgoing answering message to the remote internet terminal. After the outgoing answering message has been transmitted, the control unit 21 begins the message recording process in S2660 to store voice message transmitted from the internet terminal of the other party into the message recording unit 28b. After beginning the message recording process, the control unit 21 ends the internet-calling-software related data determination process.

If S2630 results in a negative determination (S2630:NO), then the control unit 21 ends the internet-calling-software related data determination process.

If S2610 results in a negative determination (S2610:NO), then in S2670, the control unit 21 determines whether or not the received data is the internet call termination notification from the other party of the voice call. If not (S2670:NO), then the control unit 21 ends the internet-calling-software related data determination process. On the other hand, if so (S2670:YES), then in S2680, the control unit 21 performs the internet call termination process. After completing the internet call termination process, the control unit 21 ends the internet-calling-software related data determination process.

Returning to FIG. 11, if the control unit 21 determines in S2230 that data related to the internet calling software has not been acquired (S2230:NO), then the process proceeds to S2250.

In S2250, the control unit 21 determines whether or not an internet call is currently in progress. If so (S2250:YES), then in S2260, the control unit 21 starts the internet call transmission/reception process. That is, the control unit 21 generates data in units of packets based on voice signals transmitted from the multifunction device 2 via the audio cable 300 and the voice signal I/F 24. The control unit 21 transmits this packet data to the internet terminal with which a connection has been established. At the same time, the control unit 21 outputs voice signals generated based on data in packet units received from the internet terminal with which a connection has been established via the internet 200 and the communication unit 23 to the multifunction device 2 via the voice signal I/F 24 and the audio cable 300. Then, the control unit 21 ends the second internet calling process.

On the other hand, if the control unit 21 determines in S2250 that an internet call is not in progress (S2250:NO), then in S2270, the control unit 21 determines whether or not the message recording process is currently being performed. If so (S2270:YES), then in S2280, the control unit 21 continues the message recording process to store voice signal transmitted from the internet terminal of another party into the message recording unit 28b. In S2290, the control unit 21 determines whether or not the internet call has been ended by the internet call termination process either in S2440 or S2680. If not (S2290:NO), then the control unit 21 ends the second internet calling process. On the other hand, if so (S2290:YES), then in S2300, the control unit 21 ends the message recording process, and in S2301 turns ON the message flag. Then, the control unit 21 ends the second internet calling process.

If a negative determination is made in S2270 (S2270:NO), then in S2310, the control unit 21 determines whether or not the message flag is ON. If not (S2310:NO) then the control unit 21 ends the second internet calling process. If so (S2310:YES), then in S2320, the control unit 21 determines whether or not a prescribed time (five minutes, for example) has elapsed since the previous transmission of the recorded internet-call notification. If not (S2320:NO) then the control unit 21 ends the second internet calling process. If so (S2320:YES), then in S2330, the control unit 21 transmits the recorded internet-call notification to the multifunction device 2 and ends the second internet calling process.

Third Internet Calling Process

Next, the third internet calling process will be described with reference to FIGS. 14 through 16. The third internet calling process is repeatedly executed by the control unit 31 of the handset terminal 4 while the power to the handset terminal 4 is ON.

Figure 14:
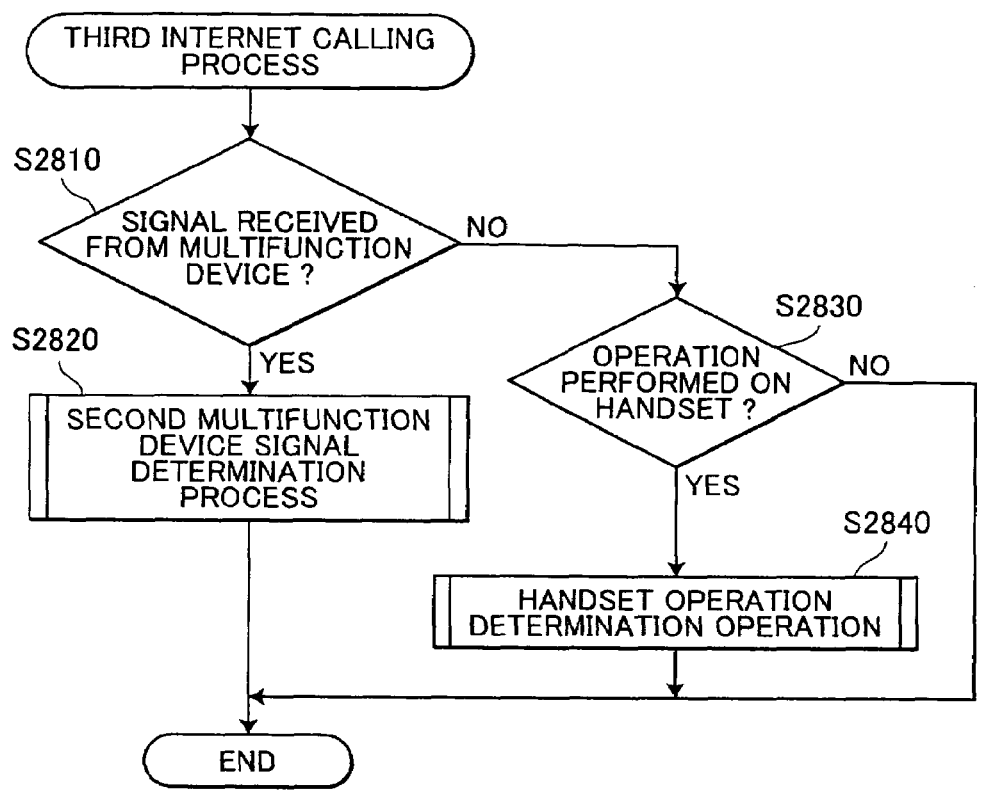
FIG. 14 is a flowchart representing a third internet calling process according to the first embodiment of the present invention.

As shown in FIG. 14, first in S2810, the control unit 31 determines whether or not a signal has been received from the multifunction device 2. If so (S2810:YES), then in S2820, the control unit 31 executes a second multifunction device signal determination process. After completing the second multifunction device signal determination process, the control unit 31 ends the third internet calling process.

The second multifunction device signal determination process will be described with reference to the flowchart of FIG. 15. In S3010, the control unit 31 determines whether or not the signal is the internet-call ring signal. If so (S3010:YES), then in S3020, the control unit 31 controls the playback unit 34 to generate the ringing sound. The ringing sound is outputted from the speaker unit 35, notifying the user of an incoming internet call.

Next in S3030, the control unit 31 determines whether or not transmission source data has been received. If not (S3030:NO), then the control unit 31 ends the second multifunction device signal determination process. On the other hand, if so (S3030:YES), then in S3040, the control unit 31 performs a process to display the transmission source data on the display panel 33b. After completing this process, the control unit 31 ends the second multifunction device signal determination process.

If it is determined in S3010 that the signal is not the internet-call ring signal (S3010:NO), then in S3050, the control unit 31 determines whether or not the signal is the connection response notification. If So (S3050:YES), then in S3060, the control unit 31 performs a process to display a message on the display panel 33b indicating that an internet call is possible. After completing this process, the control unit 31 ends the second multifunction device signal determination process.

If the control unit 31 determines in S3050 that the signal is not the connection response notification (S3050:NO), then in S3070, the control unit 31 determines whether or not the signal is the internet call termination notification. If so (S3070:YES), then in S3080, the control unit 31 performs a process to display an internet call termination message. In this process, the control unit 31 displays a message on the display panel 33b indicating that the internet call has been terminated. After completing the process to display an internet call termination message, the control unit 31 ends the second multifunction device signal determination process.

If S3070 results in a negative determination (S3070:NO), then in S3090, the control unit 31 determines whether or not the signal is the recorded internet-call notification. If so (S3090:YES), then in S3100, the control unit 31 performs a process to display a message on the display panel 33b indicating that an internet call has been recorded on the PC 3. After completing this display process, the control unit 31 ends the second multifunction device signal determination process.

If the control unit 31 determines in S3090 that the signal is not the recorded internet-call notification (S3090:NO), then the control unit 31 ends the multifunction device signal determination process.

Returning to FIG. 14, if the control unit 31 determines in S2810 that a signal has not been received from the multifunction device 2 (S2810:NO), then in S2830, the control unit 31 determines whether the operating keys 33a have been operated. If so (S2830:YES), then in S2840, the control unit 31 executes a handset-operation determination process. After completing the handset-operation determination process, the control unit 31 ends the third internet calling process.

The handset-operation determination process will be described with reference to the flowchart of FIG. 16. In S3210, the control unit 31 determines whether or not the operation is an operation to initiate an internet call. If so (S3210:YES), then in S3220, the control unit 31 transmits the internet call response signal to the multifunction device 2 and ends the handset-operation determination process.

On the other hand, if not (S3210:NO), then in S3230, the control unit 31 determines whether or not the operation is an operation to terminate an internet call. If so (S3230:YES), then in S3240, the control unit 31 transmits the internet call termination command to the multifunction device 2 and ends the handset-operation determination process. On the other hand, if not (S3230:NO), then in S3250, the control unit 31 determines whether or not the operation is an operation to play back a recorded internet call.

If so (S3250:YES), then in S3260, the control unit 31 transmits the internet-call playback command to the multifunction device 2 and ends the handset-operation determination process. If not (S3250:NO), then the control unit 31 ends the handset-operation determination process.

Returning to FIG. 14, if the control unit 31 determines in S2830 that the operating keys 33a have not been operated (S2830:NO), then the control unit 31 ends the third internet calling process.

With this configuration, when the internet telephone system 1 receives an incoming internet call from a remote internet terminal via the internet 200, the PC 3 transmits the internet-call ring signals to the multifunction device 2, so that the multifunction device 2 notifies the user of the incoming internet call. After learning of the incoming internet call, the user performs the operation to initiate an internet call from the handset terminal 4 while the ringing sound is being generated, whereby the multifunction device 2 outputs the internet call response signal to the PC 3. When the internet call response signal is inputted into the PC 3, the PC 3 outputs the connection response to the remote internet terminal, and voice signals inputted into the voice signal I/F 24 are transmitted to the remote internet terminal via the internet 200. Voice signals received from the remote internet terminal via the internet 200 are outputted to the multifunction device 2 from the voice signal I/F 24.

That is, if the user performs the operation to initiate an internet call upon receiving an incoming internet call from a remote internet terminal via the internet 200, the user can indirectly perform a voice call with the internet calling functions using the transceiver 32 of the handset terminal 4.

On the other hand, when the control signal I/F 27 of the PC 3 is not connected to the multifunction device 2, the internet-call ring signals from the PC 3 cannot be inputted into the multifunction device 2, and the PC 3 does not receive the internet call response signal from the multifunction device 2. Hence, when it is determined that the internet call response signal has not been received, the PC 3 plays the outgoing answering message to prompt the user of the remote internet terminal to leave a message and stores the voice message from the remote internet terminal into the message recording unit 28b.

That is, when the internet call response signal is not inputted into the PC 3 because the control signal I/F 27 is not connected to the multifunction device 2 or for some other reason, the PC 3 enables the answering machine function so as to transmit the voice signal for the outgoing answering message to the remote internet terminal indicating that the user cannot currently answer the call and to record a voice message from the user at the remote internet terminal.

After recording a message from the caller as described above, the PC 3 transmits the recorded internet-call notification to the multifunction device 2. When the multifunction device 2 receives the recorded internet-call notification, the multifunction device 2 notifies the user that a voice message has been recorded on the PC 3. That is, when the control signal I/F 27 is brought into connection with the multifunction device 2, the user can learn on the multifunction device 2 end that a voice message has been recorded on the PC 3.

After receiving the recorded internet-call response from the multifunction device 2, the message flag is turned OFF, whereby the PC 3 stops transmitting the recorded internet-call notification to the multifunction device 2. Accordingly, the control load for the PC 3 can be reduced.

When the user, who has learned on the multifunction device 2 end that a voice message has been recorded, performs the operation to play back the voice message, the internet-call playback command is transmitted to the PC 3 from the multifunction device 2. When the PC 3 receives the internet-call playback command, the message playback unit 28a plays back the voice message, which is then outputted to the multifunction device 2 from the voice signal I/F 24. Accordingly, the user can listen to the voice message on the multifunction device 2 end as if using an ordinary telephone terminal.

That is, even if a call is received when the multifunction device 2 is not connected to the PC 3, the user can learn of a voice message recorded on the PC 3 when the multifunction device 2 is subsequently connected to the PC 3. This configuration is convenient since the user need not go to the location in which the PC 3 is installed and operate the PC 3 to listen to the recorded voice message.

Here, when an internet call is received while the multifunction device 2 is not connected to the PC 3 and a message from the caller is stored on the PC 3, the multifunction device 2 displays the message indicating the presence of the recorded message. This increases the opportunities for the user to learn of the recorded message.

Next, a second embodiment according to the present invention will be described.

The structure of an internet calling system according to the second embodiment of the present invention is identical to that in FIG. 1. Further, the first and second incoming call processes are identical to that described in FIGS. 2 and 3. The internet calling system according to the second embodiment differs from that according to the first embodiment in the recorded message notification process. Therefore, a description of the first and second incoming call processes executed by the internet telephone system 1 of the second embodiment will be omitted. The following is a description of the recorded message notification process according to the second embodiment that is performed when a voice message from a remote internet terminal has been stored on the PC 3.

Recorded Message Notification Process

Figure 17:
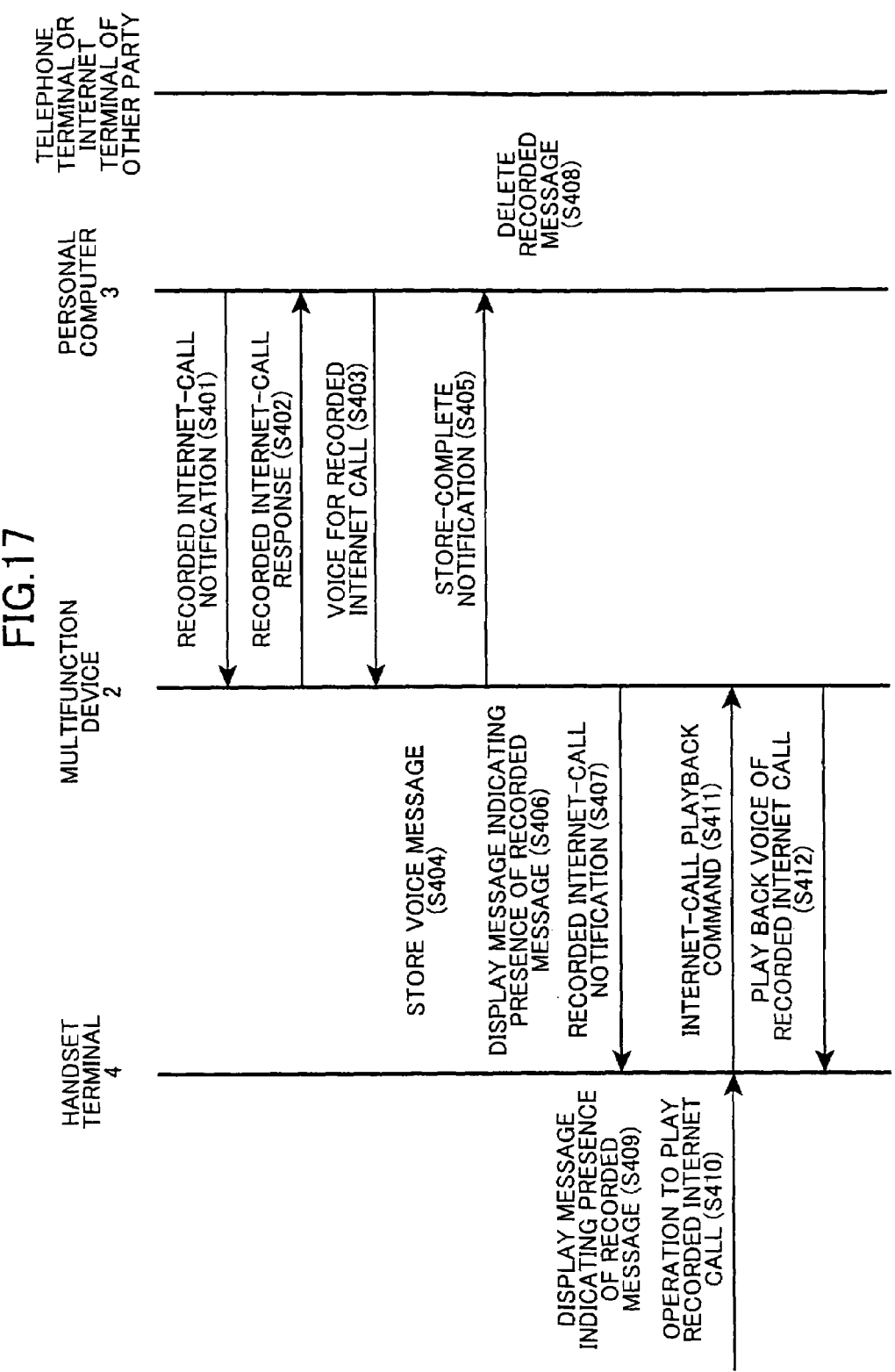
FIG. 17 is a sequence diagram showing a recorded internet-call notification process executed by the internet calling system of a second embodiment of the present invention.

A recorded message notification process according to the second embodiment will be described with reference to FIG. 17. The recorded message notification process is executed when a voice message from a remote internet terminal is stored on the PC 3.

When a voice message from the remote internet terminal is stored on the PC 3, the PC 3 transmits the recorded internet-call notification to the multifunction device 2 in S401. This notification is transmitted once every five minutes, for example, until a recorded internet-call response is received from the multifunction device 2.

When the multifunction device 2 and the PC 3 are brought into connection with each other via the control signal I/Fs 20 and 27, the multifunction device 2 receives the recorded internet-call notification. After receiving the recorded internet-call notification, the multifunction device 2 transmits the recorded internet-call response to the PC 3 in S402. Upon receiving the recorded internet-call response, in S403, the PC 3 transmits a voice message stored in the m ssage recording unit 28b to the multifunction device 2 via the control signal I/F 27.

In S404, the multifunction device 2 stores the voice message received from the PC 3 into the message recording unit 12b. After storing the voice message, the multifunction device 2 transmits in S405 a store-complete notification to the PC 3 indicating that storing the recorded voice message has been completed. In S406, the multifunction device 2 displays a message on the display panel 33b indicating that there is a recorded message. In S407, the multifunction device 2 transmits the recorded internet-call notification to the handset terminal 4.

After receiving the store-complete notification from the multifunction device 2, the PC 3 deletes the voice message from the message recording unit 28b in S408. After receiving the recorded internet-call notification, the handset terminal 4 displays a message on the display panel 33b in S409 indicating that there is a recorded message.

When the user of the internet telephone system 1 operates the operating keys 33a in S410 to perform the operation for playing back the recorded message after learning that there is a recorded message, the handset terminal 4 transmits in S411 the internet-call playback command to the multifunction device 2. After receiving the internet-call playback command, the multifunction device 2 outputs in S412 the voice message stored in the message recording unit 12b to the transceiver 32 of the handset terminal 4 via the wireless communicating unit 16. Accordingly, the recorded voice message can be heard from the transceiver 32 of the handset terminal 4.

The above-described recorded message notification process of the second embodiment as well as the first and second incoming call processes are realized by first, second, and third internet calling processes described next.

First Internet Calling Process

Next, the first internet calling process according to the second embodiment will be described. The first internet calling process according to the second embodiment is similar to that of the first embodiment, but differs in the PC signal determination process for handset-non-operating period (FIG. 6) and the handset signal determination process for handset-non-operating period (FIG. 8). Therefore, below the PC signal determination process for handset-non-operating period and the handset signal determination process for handset-non-operating period will be described while a description of all processes other than these two are omitted.

Figure 18:
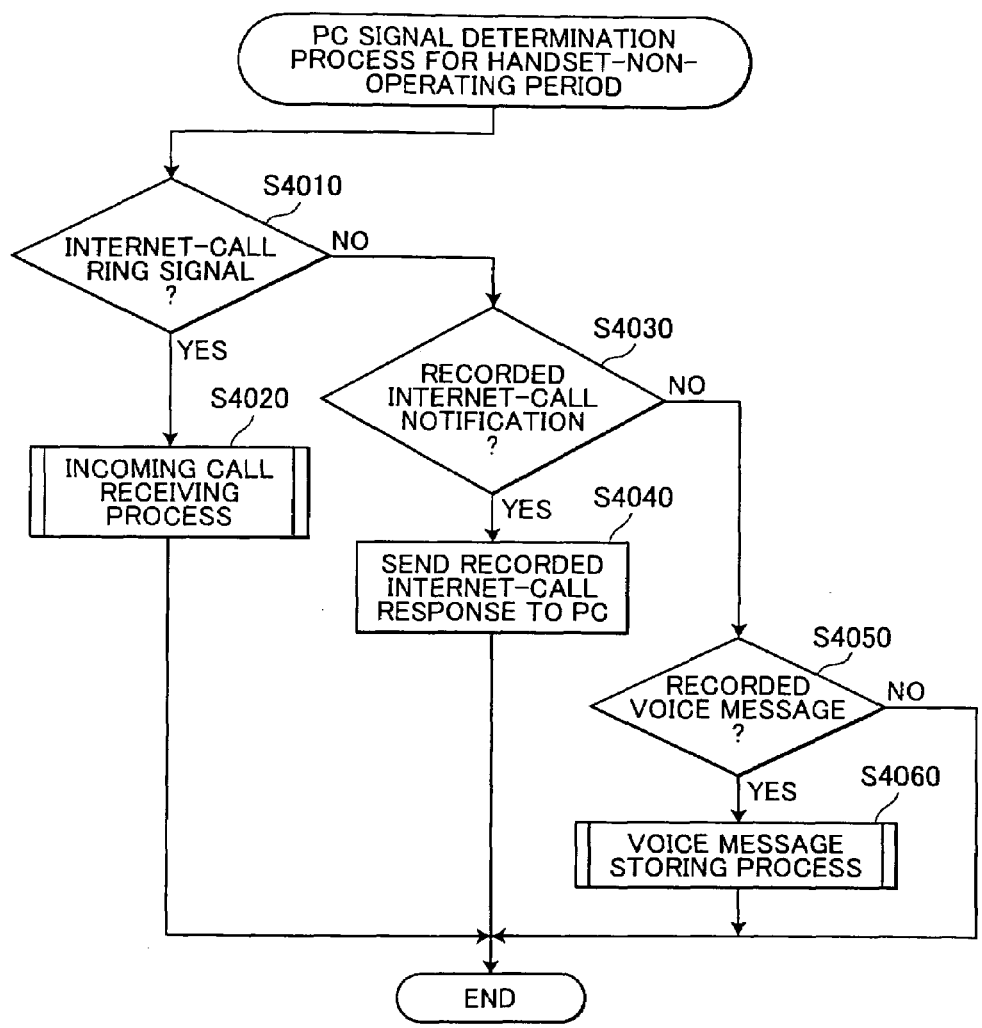
FIG. 18 is a flowchart representing a PC signal determination process for handset-non-operating period according to the second embodiment of the present invention.

First, the PC signal determination process for handset-non-operating period will be described with reference to the flowchart of FIG. 18. As shown in FIG. 18, first in S4010, the control unit 11 determines whether or not the signal is the internet-call ring signal. If so (S4010:YES), then in S4020, the control unit 11 executes the incoming call receiving process After completing the incoming call receiving process, the control unit 11 ends the PC signal determination process for handset-non-operating period. The incoming call process executed in this embodiment is identical to that according to the first embodiment.

On the other hand, if the signal is not the internet-call ring signal (S4010:NO), then in S4030, the control unit 11 determines whether or not the signal is the recorded internet-call notification. If so (S4030:YES), then in S4040, the control unit 11 transmits the recorded internet-call response to the PC 3 and ends the PC signal determination process for handset-non-operating period.

On the other hand, if the control unit 11 determines in S4030 that the signal is not the recorded internet-call notification (S4030:NO), then in S4050, the control unit 11 determines whether or not the signal is a recorded voice message. If so (S4050:YES), then in S4060, the control unit 11 executes a voice message storing process. After completing the voice message storing process, the control unit 11 ends the PC signal determination process for handset-non-operating period, If not (S4050:NO), then the control unit 11 ends the PC signal determination process for handset-non-operating period.

Figure 19:
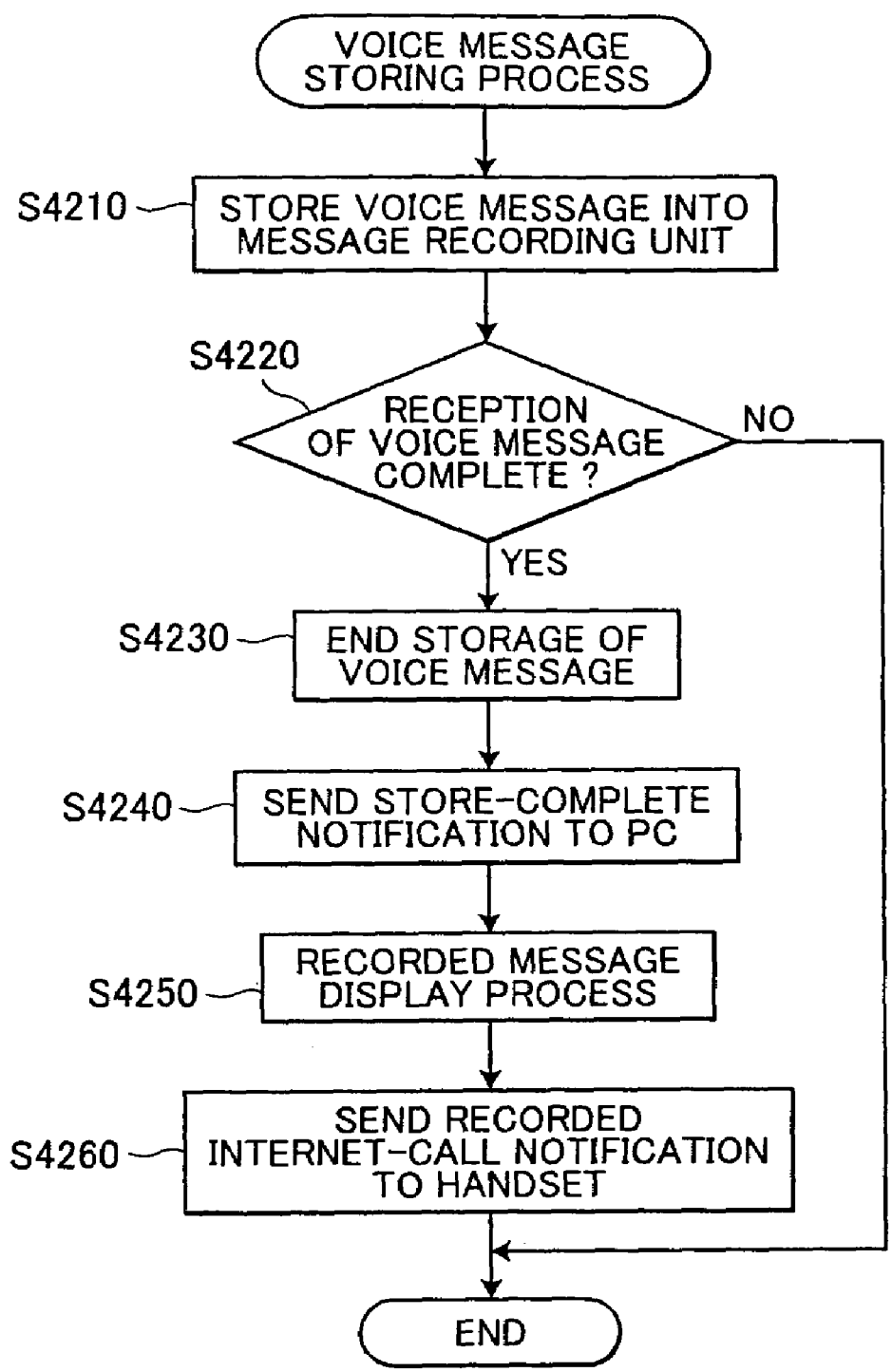
FIG. 19 is a flowchart representing a voice message storing process that is executed in S4060 of FIG. 18.

The voice message storing process executed in S4060 will be described with reference to the flowchart of FIG. 19. First in S4210, the control unit 11 stores the received voice message into the message recording unit 12b. In S4220, the control unit 11 determines whether or not reception of the voice message is complete. If so (S4220:YES), then in S4230, the control unit 11 ends a process for storing the voice message into the message recording unit 12b. In S4240, the control unit 11 transmits the store-complete notification to the PC 3 indicating that storing the recorded voice message has been completed. In S4250, the control unit 11 executes a recorded message display process, wherein the control unit 11 displays a message on the display panel 13b indicating that there is a recorded voice message. After completing the recorded message display process, in S4260, the control unit 11 transmits the recorded internet-call notification to the handset terminal 4 and ends the voice message storing process.

On the other hand, if the control unit 11 determines in S4220 that reception of the voice message is not complete (S4220:NO), then the control unit 11 ends the voice message storing process.

Next, the handset signal determination process for handset-non-operating period according to the second embodiment will be described with reference to the flowchart of FIG. 20.

Figure 20:
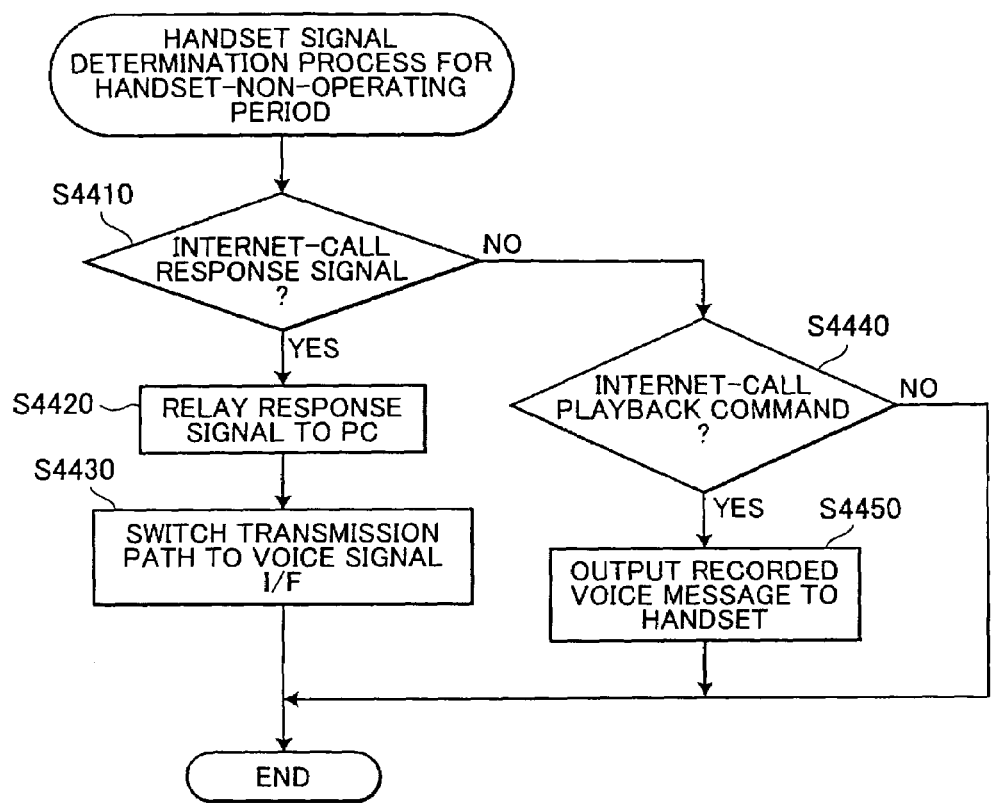
FIG. 20 is a flowchart representing a handset signal determination process for handset-non-operating period according to the second embodiment of the present invention.

As shown in FIG. 20, first in S4410, the control unit 11 determines whether or not the signal is the internet-call response signal. If so (S4410:YES), then in S4420, the control unit 11 transmits the internet-call response signal to the PC 3. In S4430, the transmission path is switched to the voice signal I/F 18, and the control unit 11 ends the handset signal determination process for handset-non-operating period.

On the other hand, if the signal is not the internet-call response signal (S4410:NO), then in S4440, the control unit 11 determines whether or not the signal is the internet-call playback command. If so (S4440:YES), then in S4450, the control unit 11 outputs a voice message stored in the message recording unit 12b to the handset terminal 4 via the wireless communicating unit 16. Subsequently, the control unit 11 ends the handset signal determination process for handset-non-operating period.

If the control unit 11 determines in S4440 that the signal is not the internet-call playback command (S4440:NO), then the control unit 11 ends the handset signal determination process for handset-non-operating period.

Second Internet Calling Process

Next, the second internet calling process according to the second embodiment will be described. The second internet calling process is executed by the control unit 21 of the PC 3. The second internet calling process of the second embodiment is similar to that of the first embodiment, but differs in the first multifunction device signal determination process (FIG. 12). Therefore, below the first multifunction device signal determination process according to the second embodiment will be described with reference to the flowchart of FIG. 21 while descriptions of all processes other than the first multifunction device signal determination process is omitted.

As shown in FIG. 21, first in S4610, the control unit 21 determines whether or not the signal is the internet-call response signal. If so (S4610:YES), then in S4620, the control unit 21 executes the internet call initiating process and ends the first multifunction device signal determination process, Here, the internet call initiating process executed in this embodiment is identical to that of the first embodiment.

On the other hand, if the signal is not the internet-call response signal (S4610:NO), then in S4630, the control unit 21 determines whether or not the signal is the internet call termination command. If so (S4630:YES), then in S4640, the control unit 21 performs the internet call termination process, which is identical to that of the first embodiment. In S4650, the control unit 21 transmits the call termination notification to the multifunction device 2. Then, the present process is ended.

If the control unit 21 determines in S4630 that the signal is not the internet call termination command (S4630:NO), then in S4660, the control unit 21 determines whether or not the signal is the recorded internet-call response. If so (S4660:YES), then in S4680, the control unit 21 transmits a voice message stored in the message recording unit 28b to the multifunction device 2 via the control signal I/F 27, and ends the first multifunction device signal determination process.

If the control unit 21 determines in S4660 that the signal is not the recorded internet-call response (S4660:NO), then in S4690, the control unit 21 determines whether or not the signal is the store-complete notification. If so (S4690:YES), then in S4700, the control unit 21 deletes the voice message from the message recording unit 28b and ends the first multifunction device signal determination process.

If the control unit 21 determines in S4690 that the signal is not the store-complete notification (S4690:NO), then the control unit 21 ends the first multifunction device signal determination process.

Third Internet Calling Process

Since the third internet calling process according to the second embodiment is the same as that of the first embodiment, a description thereof will be omitted.

As described above, because the first and second incoming call processes of the second embodiment are identical to that of the first embodiment, the internet telephone system 1 of the second embodiment achieves the same effects that are achieved in the first and second incoming call processes according to the first embodiment.

In the recorded message notification process of the second embodiment, the PC 3 transmits the recorded internet-call notification to the multifunction device 2 after a voice message from a remote internet terminal has been stored on the PC 3. Therefore, as in the first embodiment, when the control signal I/F 27 is connected to the multifunction device 2, the user on the multifunction device 2 end can learn of the voice message stored in the PC 3.

After receiving the recorded internet-call response from the multifunction device 2, the PC 3 stops transmission of the recorded internet-call notification to the multifunction device 2, thereby reducing the control load on the PC 3. Further, when the control signal I/F 27 is brought into connection with the multifunction device 2 after a voice message from the remote internet terminal has been stored on the PC 3, the PC 3 transmits the stored voice message to the multifunction device 2, and the multifunction device 2 stores the voice message into the message recording unit 12b. Therefore, if the control signal I/F 27 of the PC 3 is subsequently disconnected from the multifunction device 2 before the user listens to the voice message, the user can still listen to the voice message on the multifunction device 2 end.

After the voice message has been stored in the message recording unit 12b, the user is notified that a voice message has been stored. By performing the operation for playing back the message, the user can listen to the voice message stored in the message recording unit 12b on the multifunction device 2 end as if operating a normal telephone terminal.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiments described above, the multifunction device 2 is configured as a telephone terminal. However, the telephone terminal construction of the present invention can be applied to a device other than the multifunction device 2, provided the device has the functions of a telephone terminal.

In the embodiments described above, the internet calling processes described in FIGS. 5 through 10 and FIGS. 18 through 20 are executed by a computer system including the control unit 11 of the multifunction device 2. However, these processes can be executed by a separate computer system connected to the multifunction device 2 by a wired or a wireless signal transmission path.

Figure 15:
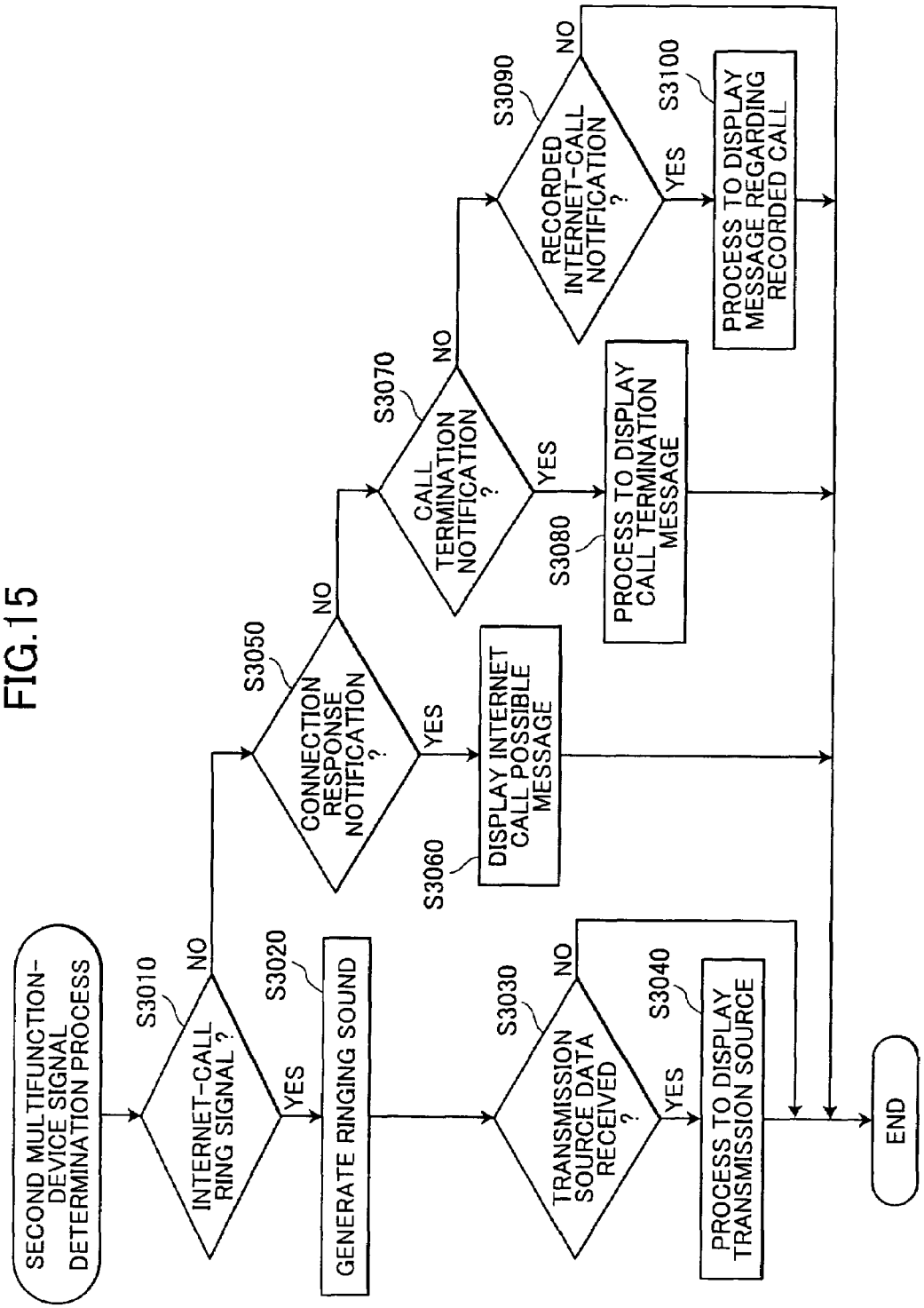
FIG. 15 is a flowchart representing a second multifunction device signal determination process that is executed in S2820 of FIG. 14.
Figure 16:
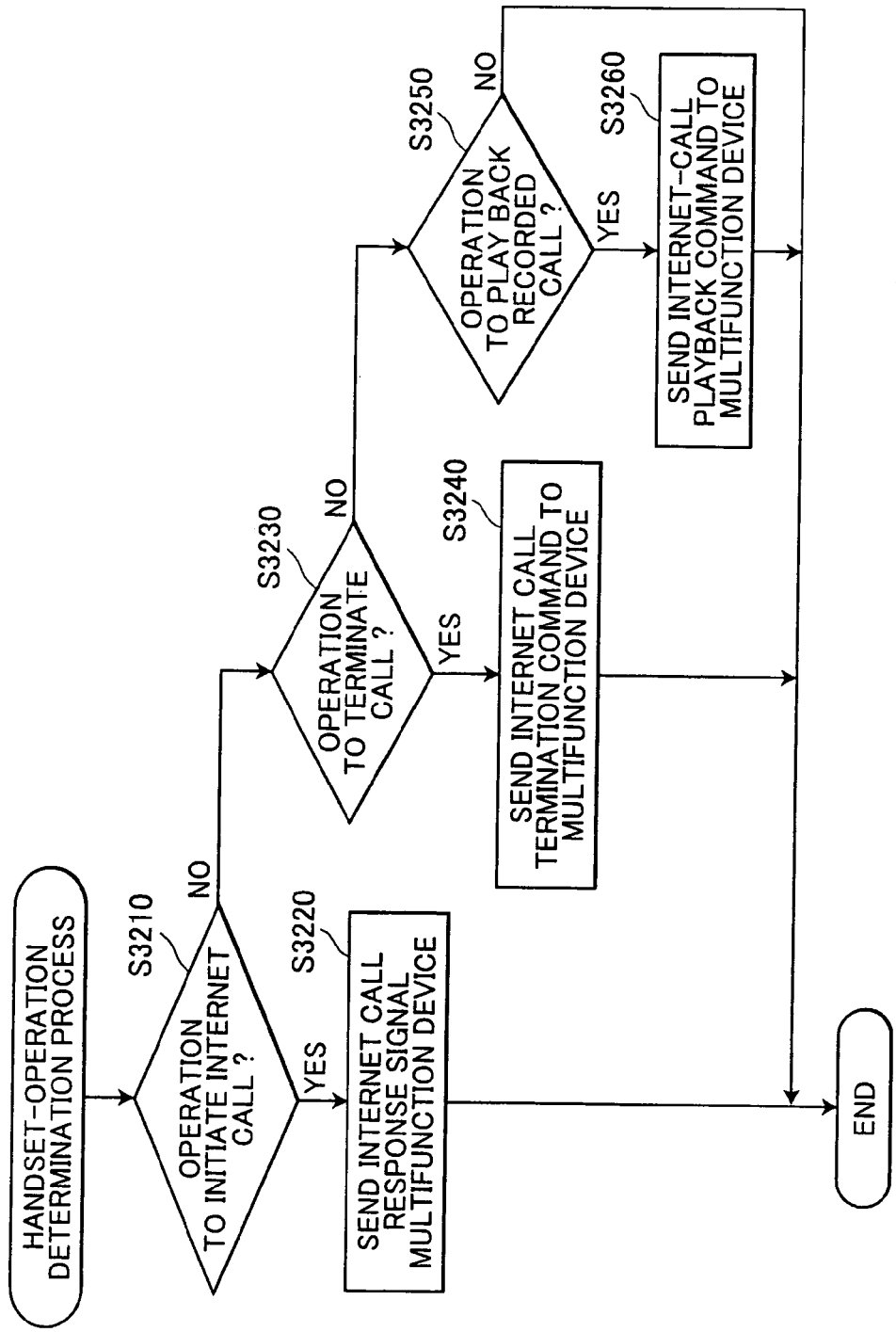
FIG. 16 is a flowchart representing a handset-operation determination process that is executed in S2840 of FIG. 11.

In the embodiments described above, the internet calling process described in FIGS. 14 through 16 is executed by a computer system including the control unit 31 of the handset terminal 4. However, this process can be executed by a separate computer system connected to the handset terminal 4 by a wired or a wireless signal transmission path.

In the embodiment described above, an internet call is initiated or terminated by operating the operating keys 33a of the user I/F 33 on the handset terminal 4, and voice input and output is achieved with the transceiver 32. However, an internet call can also be initiated and terminated by operating the operating keys 13a of the user interface unit 13 on the multifunction device 2, while voice input and output can be achieved by the handset 14 or the speaker 15a and microphone 15b of the voice input/output unit 15. In the latter case, when the control unit 11 determines that the user has operated the operating keys 13a to initiate an internet call, the control unit 11 can transmit the internet-call response signal to the PC 3.

In the embodiments described above, the user plays back a recorded voice message by operating the operating keys 33a of the user I/F 33 on the handset terminal 4, and the voice message is outputted to the transceiver 32. However, the user can play back a recorded voice message by operating the operating keys 13a of the user interface unit 13 on the multifunction device 2, while the voice message can be outputted via the handset 14 or the speaker 15a of the voice input/output unit 15. In the latter case, when the control unit 11 determines that the user has operated the operating keys 13a to play back a recorded voice message, then the control unit 11 can transmit the internet-call playback command to the PC 3.

Further, operations performed according to a prescribed procedure can be used to indicate when to initiate or terminate an internet call or to play back a recorded message. Some specific examples of special operating procedures including holding down a specific operating button for a specific period of time or pushing a plurality of operating buttons in a prescribed sequence.

Figure 13:
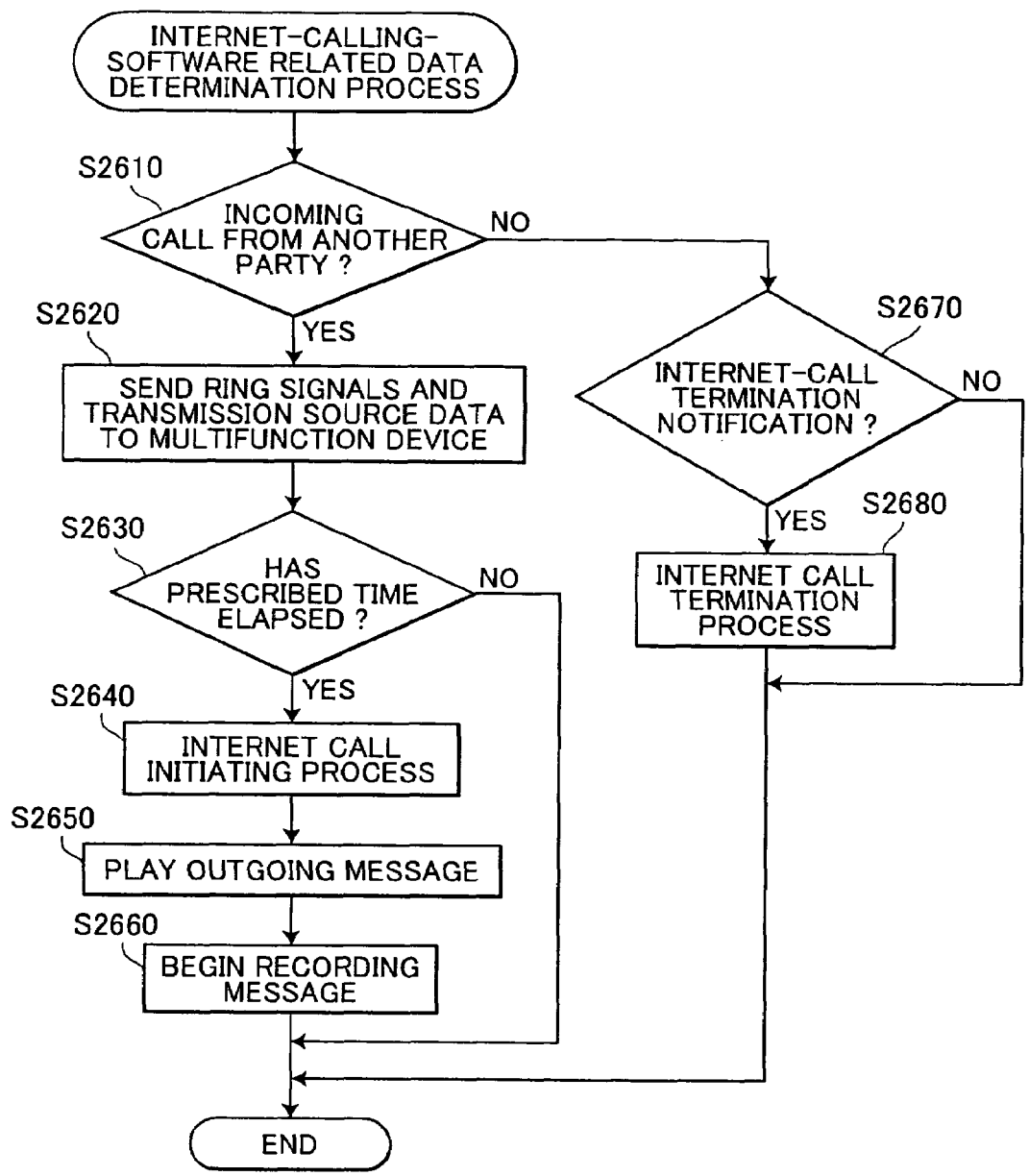
FIG. 13 is a flowchart representing an internet-calling-software related data determination process that is executed in S2240 of FIG. 11.

In the embodiments described above, ringing sounds are outputted from the speaker unit 35 in the process of S3220 in FIG. 13. However, the present invention can be configured to output ringing sounds from one or both of the speaker unit 35 and the speaker 15a in order to notify the user of an incoming call. Further, a message indicating an incoming call can be displayed on one or both of the display panel 13b in the user interface unit 13 and the display panel 33b in the handset terminal 4.

In the embodiment described above, a message indicating the existence of a recorded voice message is displayed on the display panel 13b and the display panel 33b in the process of S1250 in FIG. 6 and the process of S3100 in FIG. 15. However, the present invention can be configured to output ringing sounds from one or both of the speaker unit 35 and the speaker 15a in order to notify the user of the existence of a recorded voice message. Further, the present invention can also be configured to display a message on one or both of the display panel 13b and the display panel 33b.

Programs for the above-described internet calling processes could be supplied to the telephone terminal itself, the computer system, or the user of this equipment in the form of a floppy disk, a CD-ROM, or other recording media, or is acquired via a communication network, such as the Internet.

What is claimed is:

1. An internet terminal comprising:

a voice signal input/output terminal via which voice signals are output to and input from an external telephone terminal including a communications transceiver, wherein the voice signals are not input from the external telephone terminal to the voice signal input/output terminal when the voice signals are to be transmitted to another telephone terminal that is not connected to another internet terminal;

a control signal input/output terminal via which control signals are output to and input from the telephone terminal;

a voice signal relaying unit that performs a relaying process for transmitting voice signals received via the voice signal input/output terminal from the telephone terminal to another internet terminal via an internet and for outputting voice signals received from the another internet terminal via the internet to the telephone terminal via the voice signal input/output terminal;

a ring signal output unit that outputs a ring signal via the control signal input/output terminal to the telephone terminal when a ring signal for an internet call is received by the voice signal relaying unit from the another internet terminal via the internet;

a determining unit that determines whether a ring response signal is received via the control signal input/output terminal after the ring signal output unit has output the ring signal to the telephone terminal, the ring response signal being output from the telephone terminal in response to the ring signal;

a message output unit that outputs a predetermined outgoing message to the another internet terminal through the voice signal relaying unit, the outgoing message prompting a caller at the another internet terminal to leave a message;

a memory that stores voice signals received by the voice signal relaying unit from the another internet terminal; and a control unit that controls the voice signal relaying unit and the message output unit, wherein the control unit controls the voice signal relaying unit to perform the relaying process when the determining unit determines that the ring response signal has been received from the telephone terminal, and the control unit controls the message output unit to output the outgoing message to the another internet terminal and stores voice signals received by the voice signal relaying unit from the another internet terminal into the memory when the determining unit determines that the ring response signal was not received from the telephone terminal.

2. The internet terminal according to claim 1, further comprising a playback unit that outputs a voice message based on the voice signals stored in the memory to the telephone terminal via the voice signal input/output terminal when a playback command from the telephone terminal is received via the control signal input/output terminal.

3. The internet terminal according to claim 1, further comprising a notifying unit that outputs a notification signal to the telephone terminal via the control signal input/output terminal when the voice signals from the another internet terminal are being stored in the memory, the notification signal notifying a user of presence of a recorded voice message.

4. The internet terminal according to claim 3, further comprising a playback unit that outputs a voice message based on the voice signals stored in the memory to the telephone terminal via the voice signal input/output terminal when a notification response is received via the control signal input/output terminal from the telephone terminal, the notification response being output from the telephone terminal in response to the notification signal.

5. A telephone terminal comprising:

a telephone line connecting terminal that connects to a telephone line network;

a transceiver that enables a voice call based on voice signals transmitted to and received from an external telephone terminal via the telephone line connecting terminal and the telephone line network;

a voice signal input/output terminal via which voice signals are output to and input from the internet terminal of claim 3;

a control signal input/output terminal via which control signals are output to and input from the internet terminal;

a first notifying unit that notifies a user of an incoming call when a ring signal is received from the internet terminal via the control signal input/output terminal;

an input unit that inputs a call-initiate command to initiate an internet call through operations by the user;

a switching unit that switches a transmission terminal between the telephone line connecting terminal and the voice signal input/output terminal, wherein the switching unit switches the transmission terminal to the voice signal input/output terminal when the call-initiate command is input;

a terminal controller that outputs a ring response signal to the internet terminal via the control signal input/output terminal when the call-initiate command is input, the ring response signal instructing the internet terminal to perform a relaying process for relaying voice signals between another internet terminal and the voice signal input/output terminal; and a second notifying unit that notifies the user of a stored voice message when a notification signal is received from the internet terminal.

6. The telephone terminal according to claim 5, wherein voice signals are transmitted to and from the transceiver via the transmission terminal.

7. The telephone terminal according to claim 5, further comprising a response signal output unit that outputs a notification response to the internet terminal via the control signal input/output terminal when the notification signal is received from the internet terminal via the control signal input/output terminal, the notification response indicating that the notification signal has been received.

8. The telephone terminal according to claim 5, wherein:

the input unit further inputs a playback command through operations by the user;

the switching unit switches the transmission terminal to the voice signal input/output terminal when the playback command is input; and the terminal controller outputs the playback command via the control signal input/output terminal to the internet terminal, the playback command instructing the internet terminal to output a voice message based on voice signals stored on the internet terminal.

9. A telephone terminal comprising:

a telephone line connecting terminal that connects to a telephone line network;

a transceiver that enables a voice call based on voice signals transmitted to and received from an external telephone terminal via the telephone line connecting terminal and the telephone line network;

a voice signal input/output terminal via which voice signals are output to and input from the internet terminal of claim 4;

a control signal input/output terminal via which control signals are output to and input from the internet terminal;

a first notifying unit that notifies a user of an incoming call when a ring signal is received from the internet terminal via the control signal input/output terminal;

an input unit that inputs a call-initiate command to initiate an internet call through operations by the user;

a switching unit that switches a transmission terminal between the telephone line connecting terminal and the voice signal input/output terminal, wherein the switching unit switches the transmission terminal to the voice signal input/output terminal when the call-initiate command is input;

a terminal controller that outputs a ring response signal to the internet terminal via the control signal input/output terminal when the call-initiate command is input, the ring response signal instructing the internet terminal to perform a relaying process to relay voice signals between another internet terminal and the voice signal input/output terminal;

a response signal output unit that outputs a notification response to the internet terminal via the control signal input/output terminal when a notification signal is received from the internet terminal, the notification signal indicating that a voice message has been stored on the internet terminal;

a memory that stores a voice message received from the internet terminal, the voice message being output from the internet terminal in response to the notification response; and a second notifying unit that notifies the user of the voice message stored in the memory.

10. The telephone terminal according to claim 9, further comprising a playback unit, wherein the input unit further inputs a playback command through operations by the user, and the playback unit outputs the voice message stored in the memory to the transceiver when the playback command is input.

11. An internet telephone system comprising:

the internet terminal of claim 3; and a telephone terminal including:

a telephone line connecting terminal that connects to a telephone line network;

a transceiver that enables a voice call based on voice signals transmitted to and received from an external telephone terminal via the telephone line connecting terminal and the telephone line network;

another voice signal input/output terminal via which voice signals are output to and input from the voice signal input/output terminal of the internet terminal;

another control signal input/output terminal via which control signals are output to and input from the control signal input/output terminal of the internet terminal;

an incoming-call notifying unit that notifies a user of an incoming call when a ring signal is received from the internet terminal via the another control signal input/output terminal;

an input unit that inputs a call-initiate command to initiate an internet call through operations by the user;

a switching unit that switches a transmission terminal between the telephone line connecting terminal and the another voice signal input/output terminal, wherein the switching unit switches the transmission terminal to the another voice signal input/output terminal when the call-initiate command is input;

a terminal controller that outputs a ring response signal to the internet terminal via the another control signal input/output terminal when the call-initiate command is input; and a message notifying unit that notifies the user of a stored voice message when the notification signal is received from the internet terminal.

12. The internet telephone system according to claim 11, wherein:

the input unit further inputs a playback command through operations by the user;

the switching unit switches the transmission terminal to the another voice signal input/output terminal when the playback command is input; and the terminal controller outputs the playback command via the another control signal input/output terminal to the internet terminal, the playback command instructing the internet terminal to output a voice message based on voice signals stored on the internet terminal.

13. An internet telephone system comprising:

the internet terminal of claim 2; and a telephone terminal including:

a telephone line connecting terminal that connects to a telephone line network;

a transceiver that enables a voice call based on voice signals transmitted to and received from an external telephone terminal via the telephone line connecting terminal and the telephone line network;

another voice signal input/output terminal via which voice signals are output to and input from the voice signal input/output terminal of the internet terminal;

another control signal input/output terminal via which control signals are output to and input from the control signal input/output terminal of the internet terminal;

an incoming-call notifying unit that notifies a user of an incoming call when a ring signal is received from the internet terminal via the another control signal input/output terminal;

an input unit that inputs a call-initiate command to initiate an internet call through operations by the user;

a switching unit that switches a transmission terminal between the telephone line connecting terminal and the another voice signal input/output terminal, wherein the switching unit switches the transmission terminal to the another voice signal input/output terminal when the call-initiate command is input;

a terminal controller that outputs a ring response signal to the internet terminal via the another control signal input/output terminal when the call-initiate command is input; and a message notifying unit that notifies the user of a stored voice message when the notification signal is received from the internet terminal, wherein the input unit further inputs a playback command through operations by the user;

the switching unit switches the transmission terminal to the another voice signal input/output terminal when the playback command is input; and the terminal controller outputs the playback command via the another control signal input/output terminal to the internet terminal.

14. An internet telephone system comprising:
the internet terminal of claim 4; and
a telephone terminal including:
- a telephone line connecting terminal that connects to a telephone line network;
- a transceiver that enables a voice call based on voice signals transmitted to and received from an external telephone terminal via the telephone line connecting terminal and the telephone line network;
- another voice signal input/output terminal via which voice signals are output to and input from the voice signal input/output terminal of the internet terminal;
- another control signal input/output terminal via which control signals are output to and input from the control signal input/output terminal of the internet terminal;
- an incoming-call notifying unit that notifies a user of an incoming call when a ring signal is received from the internet terminal via the another control signal input/output terminal;
- an input unit that inputs a call-initiate command to initiate an internet call through operations by the user;
- a switching unit that switches a transmission terminal between the telephone line connecting terminal and the another voice signal input/output terminal, wherein the switching unit switches the transmission terminal to the another voice signal input/output terminal when the call-initiate command is input;
- a terminal controller that outputs a ring response signal to the internet terminal via the another control signal input/output terminal when the call-initiate command is input;
- a response signal output unit that outputs a notification response to the internet terminal via the another control signal input/output terminal in response to the notification signal received from the internet terminal;
- another memory that stores a voice message received from the internet terminal, the voice message being output by the internet terminal in response to the notification response; and
- a message notifying unit that notifies the user of the voice message stored in the another memory.

15. A storing medium storing a control program for controlling a telephone terminal communicable with the internet terminal of claim 3, the control program comprising the programs of:
- notifying a user of an incoming call when a ring signal is received from the internet terminal via a control signal input/output terminal;
- inputting a call-initiate command to initiate an internet call through operations by the user;
- switching a transmission terminal from a telephone line connecting terminal to a voice signal input/output terminal when the call-initiate command is input;
- outputting a ring response signal to the internet terminal via the control signal input/output terminal when the call-initiate command is input; and
- notifying the user of a stored voice message when a notification signal is received from the internet terminal.

16. The storing medium according to claim 15, wherein the control program further comprises the program of outputting a notification response to the internet terminal via the control signal input/output terminal when the notification signal is received from the internet terminal via the control signal input/output terminal, the notification response indicating that the notification signal has been received.

17. A storing medium storing a control program for controlling a telephone terminal communicable with the internet terminal of claim 4, the control program comprising the programs of:
- notifying a user of an incoming call when a ring signal is received from the internet terminal via a control signal input/output terminal;
- inputting a call-initiate command to initiate an internet call through operations by the user;
- switching a transmission terminal from a telephone line connecting terminal to a voice signal input/output terminal when the call-initiate command is input;
- outputting a ring response signal to the internet terminal via the control signal input/output terminal when the call-initiate command is input, the ring response signal instructing the internet terminal to perform a relaying process to relay voice signals between another internet terminal and the voice signal input/output terminal;
- outputting a notification response to the internet terminal via the control signal input/output terminal when a notification signal is received from the internet terminal, the notification signal indicating that a voice message has been stored on the internet terminal;
- storing a voice message received from the internet terminal into a memory, the voice message being output by the internet terminal in response to the notification response; and
- notifying the user of the voice message stored in the memory.

18. The storing medium according to claim 17, wherein the control program further comprises the programs of inputting a playback command through operations by the user, and outputting the voice message stored in the memory to a transceiver when the playback command is input.

* * * * *